United States Patent
Pabla

(10) Patent No.: US 7,272,636 B2
(45) Date of Patent: Sep. 18, 2007

(54) PEER GROUP NAME SERVER

(75) Inventor: Kuldipsingh Pabla, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 921 days.

(21) Appl. No.: 10/025,169

(22) Filed: Dec. 18, 2001

(65) Prior Publication Data

US 2002/0156875 A1 Oct. 24, 2002

Related U.S. Application Data

(60) Provisional application No. 60/286,407, filed on Apr. 24, 2001.

(51) Int. Cl.
*G06F 15/13* (2006.01)
(52) U.S. Cl. .................. 709/216; 709/223; 370/389; 370/392
(58) Field of Classification Search ........... 709/216, 709/223; 370/389, 392
See application file for complete search history.

(56) References Cited

U.S. PATENT DOCUMENTS

| | | | |
|---|---|---|---|
| 5,109,483 A | 4/1992 | Baratz et al. |
| 5,224,205 A | 6/1993 | Dinkin et al. |
| 5,442,637 A | 8/1995 | Nguyen |
| 5,517,622 A | 5/1996 | Ivanoff et al. |
| 5,675,629 A | 10/1997 | Raffel et al. |
| 5,675,782 A | 10/1997 | Montague et al. |
| 5,719,861 A | 2/1998 | Okanoue |
| 5,729,682 A | 3/1998 | Marquis et al. |
| 5,758,087 A | 5/1998 | Aaker et al. |
| 5,768,527 A | 6/1998 | Zhu et al. |
| 5,805,820 A | 9/1998 | Bellovin et al. |

(Continued)

FOREIGN PATENT DOCUMENTS

EP 993 163 4/2000

(Continued)

OTHER PUBLICATIONS

Kalt, C., "RFC 2812 Internet Relay Chat: Client Protocol," Request for Comments, Apr. 2000, pp. 1-63, XP002242624.

(Continued)

*Primary Examiner*—Jinsong Hu
(74) *Attorney, Agent, or Firm*—Robert C. Kowert; Meyertons, Hood, Kivlin, Kowert & Goetzel, P.C.

(57) ABSTRACT

A system and method for providing a name service in a peer-to-peer environment is described. A peer group name server may be a standalone name server that may be used in peer-to-peer applications and environments. A network computing platform may be used as a basis for establishing and operating a peer-to-peer network. A peer group name server may cache information about peers, peer groups and other entities. Peers may discover other peers, peer groups and other entities through the peer group name server. A peer group name server may serve as a reverse lookup provider. A peer group name server may act as a registrar for named entities (e.g. peers) in the peer-to-peer networking environment. In one embodiment, peer group name servers may maintain information about other peer group name servers, thus making a network of decentralized peer group name servers.

70 Claims, 12 Drawing Sheets

U.S. PATENT DOCUMENTS

| | | | |
|---|---|---|---|
| 5,896,503 | A | 4/1999 | Badovinatz et al. |
| 5,931,916 | A | 8/1999 | Barker et al. |
| 5,941,988 | A | 8/1999 | Bhagwat et al. |
| 5,999,530 | A | 12/1999 | LeMaire et al. |
| 6,032,175 | A | 2/2000 | Fletcher et al. |
| 6,061,734 | A | 5/2000 | London |
| 6,105,064 | A | 8/2000 | Davis et al. |
| 6,182,136 | B1 | 1/2001 | Ramanathan et al. |
| 6,212,558 | B1 | 4/2001 | Antur et al. |
| 6,269,099 | B1* | 7/2001 | Borella et al. ............... 370/389 |
| 6,324,580 | B1 | 11/2001 | Jindal et al. |
| 6,408,341 | B1 | 6/2002 | Feeney et al. |
| 6,456,600 | B1 | 9/2002 | Rochberger et al. |
| 6,477,590 | B1 | 11/2002 | Habusha et al. |
| 6,591,310 | B1 | 7/2003 | Johnson |
| 6,611,872 | B1 | 8/2003 | McCanne |
| 6,633,761 | B1 | 10/2003 | Singhal et al. |
| 6,651,105 | B1 | 11/2003 | Bhagwat et al. |
| 6,658,540 | B1 | 12/2003 | Sicola et al. |
| 6,671,746 | B1 | 12/2003 | Northrup |
| 6,680,942 | B2* | 1/2004 | Mead et al. ................ 370/392 |
| 6,681,282 | B1 | 1/2004 | Golden et al. |
| 6,721,286 | B1 | 4/2004 | Williams et al. |
| 6,732,180 | B1 | 5/2004 | Hale et al. |
| 6,742,023 | B1 | 5/2004 | Fanning et al. |
| 6,778,491 | B1 | 8/2004 | Fourcand et al. |
| 6,782,527 | B1 | 8/2004 | Kouznetsov et al. |
| 6,795,917 | B1 | 9/2004 | Yionen |
| 6,810,259 | B1 | 10/2004 | Zhang |
| 6,816,461 | B1 | 11/2004 | Scrandis et al. |
| 6,826,763 | B1 | 11/2004 | Wange et al. |
| 6,845,091 | B2 | 1/2005 | Ogier et al. |
| 6,865,600 | B1 | 3/2005 | Brydon et al. |
| 6,892,230 | B1 | 5/2005 | Gu et al. |
| 2001/0027479 | A1* | 10/2001 | Delaney et al. ............. 709/216 |
| 2002/0062375 | A1 | 5/2002 | Teodosiu et al. |
| 2002/0073075 | A1 | 6/2002 | Dutta et al. |
| 2002/0073204 | A1 | 6/2002 | Dutta et al. |
| 2002/0107935 | A1 | 8/2002 | Lowery et al. |
| 2002/0161821 | A1 | 10/2002 | Narayan et al. |
| 2003/0041141 | A1* | 2/2003 | Abdelaziz et al. .......... 709/223 |
| 2003/0067912 | A1 | 4/2003 | Mead et al. |
| 2004/0068477 | A1 | 4/2004 | Gilmour et al. |
| 2005/0053093 | A1 | 3/2005 | Fukushima et al. |

FOREIGN PATENT DOCUMENTS

EP   022 876   7/2000

OTHER PUBLICATIONS

Marmor, M.S., "Make the P2P Leap with Toadnode," Web Technologies, Miller Freeman, US, vol. 5, No. 12, Dec. 2000, pp. 44-49, XP008000376, ISSN: 1086-556X, *Section "How the Gnutella Protocol Works," on pp. 46-46*.

Krikorian, R., "Hello JXTA," The O'Reilly Network, Online!, Apr. 25, 2001, pp. 1-9, XP002249288.

DRSCHOLL@USERS.SOURCEFORGE.NET: "Napster Messages," Open Source Napster Server, 'Online!, Apr. 7, 2000, pp. 1-25, XP002249287.

European Search Report for P014081EP, 02252901.0-2413- mailed Aug. 8, 2003, 3 pages.

Ratnasamy, et al., "A Scalable Content-Addressable Network," SIGCOMM'01, San Diego, CA, Aug. 27-31, 2001, pp. 161-172.

Stoica, et al., "Chord: A Scalable Peer-to-Peer Lookup Service for Internet Applications," SIGCOMM'01, San Diego, CA, Aug. 27-31, 2001, pp. 1-12.

Microsoft Computer Dictionary, 1999, Microsoft, 4th Edition, p. 252.

* cited by examiner

Policy Advertisement

| Element Name (A String) | Element Value Type |
|---|---|
| Policy Name | A non-canonical resource name (suitable for UI display) |
| Policy Keywords | String[] |
| Policy Resolver | <Peer Endpoint> to which the query generation and resolve messages are to be sent |

*FIG. 13*

Peer Advertisement

| Element Name (A String) | Element Value Type |
|---|---|
| Peer Endpoint | <Peer Endpoint[]> |

*FIG. 14*

Peer Group Advertisement

| Element Name (A String) | Element Value Type |
|---|---|
| Membership Application Policy | <Policy Advertisement> |
| New Member Approval Policy (Authentication) | <Policy Advertisement> |
| Content Sharing Policy | <Policy Advertisement> |
| Peer Discovery Policy | <Policy Advertisement> |
| Policy Resolver Policy | <Policy Advertisement> |
| Pipe Resolver Policy | <Policy Advertisement> |

*FIG. 15*

Pipe Advertisement

| Element Name (A String) | Element Value Type |
|---|---|
| Direction | <Pipe Direction> (In or Out) |

*FIG. 16*

Service Advertisement

| Element Name (A String) | Element Value Type |
|---|---|
| Access Policy | <Policy Advertisement> |

*FIG. 17*

Content Advertisement

| Element Name (A String) | Element Value Type |
|---|---|
| Type (Optional) | String |
| Size (Required) | Long |
| Encoding (Required) | <By Value> or <By Reference> |
| Content ID (Required) | <Content ID> |
| About ID (Optional) | <Content ID> |
| Peer ID (Optional) | <Peer Advertisement> |

*FIG. 18*

PEER GROUP NAME SERVER

This application claims benefit of priority to U.S. Provisional Application Ser. No. 60/286,407, filed Apr. 24, 2001.

BACKGROUND OF THE INVENTION

1. Field of the Invention

This invention relates to peer-to-peer networking, and more particularly to a system and method for providing a name service in a peer-to-peer environment.

2. Description of the Related Art

Traditionally, devices on the Internet were assumed to be always on and connected, and were thus assigned permanent IP addresses. The Domain Name System (DNS) was designed for this environment, where IP address changes were rare. The DNS is the way that Internet domain names are located and translated into Internet Protocol (IP) addresses. Because maintaining a central list of domain name/IP address correspondences would be impractical, the lists of domain names and IP addresses are distributed throughout the Internet in a hierarchy of DNS servers.

With the advent of web browsers, the World Wide Web and the explosion of Internet use in the mid-1990s, devices may need to be periodically connected to the Internet over a modem, and thus need their own IP addresses. For devices that may frequently connect and disconnect to the Internet, IP addresses may be assigned dynamically, giving each device a different, possibly masked IP address with each new connection. The dynamic addressing scheme prevents devices using dynamic IP addressing from having DNS entries, and therefore prevents the devices from acting as servers that may host data and/or network applications in the client/server model.

Centralized, server-based sharing among clients in a client/server model requires an intermediary such as a Web, e-mail or corporate server. FIG. 1 illustrates a prior art client/server system. Server 100 serves as an intermediary among the various client devices 102. Client devices may include, but by no means are limited to: smart appliances, printers, personal digital assistants (PDAs), cellular/mobile phones, notebook computers, laptops, desktop computers, workstations, more powerful computer systems such as mainframes and high-end servers, even supercomputers. Servers are typically computer systems with sufficient memory, storage, processor speed, data communications support, and other necessary resources to perform the functions of a server in the client/server model. Information and file exchange among the client devices 102 is through server 100. For example, in the client/server model, client device 102A cannot directly connect to client device 102B to download files.

Prior to the development of the peer-to-peer model, computer user's systems connected to the Internet were typically relegated to being clients in a client/server model. When operating in a peer-to-peer model on the Internet, a system typically operates outside of the Domain Name System (DNS), and thus operates independently from the client/server model of the Internet that may include DNS servers and other servers.

In the peer-to-peer model (also referred to as P2P), a peer device, or simply peer, may bypass servers to remotely access files and information on from another peer. Peers in the peer-to-peer model typically may share information and files with other peers, and may exchange and search for information and files on a network of users (peers) with common interests. A network of peers with common interests may be referred to as a peer group. Thus, the peer-to-peer model allows the sharing of computer resources and services by direct exchange between systems (peers). A peer-to-peer model generally includes a discovery mechanism (a method by which a peer may locate other peers and peer groups), and a mechanism for allowing the peer to connect to discovered peers and to join discovered peer groups.

In the peer-to-peer model, computers that in the client/server model were used only as clients may communicate directly with other systems (peers), allowing systems that were traditionally client-only systems to serve as a client of other peer systems and as a server for other peer systems. Thus, the peer-to-peer model helps to reduce the load on server systems by allowing peers to bypass the server for information, file exchange, and some resource sharing, allowing the servers to perform services which require the specialized hardware and/or software of a "dedicated" server system.

FIGS. 2A and 2B are examples illustrating the peer-to-peer model. FIG. 2A shows two peer devices 104A and 104B that are currently connected. Either of the two peer devices 104 may serve as a client of or a server to the other device. FIG. 2B shows several peer devices 104 connected over the network 106 in a peer group. In the peer group, any of the peer devices 104 may serve as a client of or a server to any of the other devices.

On the Internet, peer-to-peer may be used to refer to a type of transient Internet network that allows a group of computer users (peers) with the same networking program to connect with each other and directly access files from one another's hard drives. A user must first download and execute the peer-to-peer networking program. After launching the program, the user enters the IP address of another computer belonging to the network. Once the computer finds another network member on-line, it may connect to that user's connection (who has gotten their IP address from another user's connection and so on). Users may choose how many member connections to seek at one time and determine which files they wish to share or password protect.

SUMMARY OF THE INVENTION

A system and method for providing a name service in a peer-to-peer networking environment is described. In one embodiment, a peer group name server may be a standalone name server that may be used in a variety of peer-to-peer applications and environments. A peer group name server may operate in the peer-to-peer networking environment to provide name services to peers participating in the peer-to-peer networking environment. In one embodiment, each peer has a unique symbolic name and a unique peer identifier. In one embodiment, other entities such as peer groups, content and services may also have symbolic names and identifiers. In one embodiment, the identifiers may be dynamic. For example, a peer may be assigned a different identifier in different sessions on the peer-to-peer network. As a name service, the peer group name server may provide a name registry that may serve as a bridge between symbolic names of entities (e.g. peers, peer groups, etc.) in the peer-to-peer networking environment and indexes or identifiers that may be used in connecting to the entities in the peer-to-peer networking environment.

A network computing platform may be used as a basis for establishing and operating a peer-to-peer networking environment. In one embodiment, the peer group name server may be a peer in the peer-to-peer networking environment, and thus may operate in accordance with the network computing platform. A novel open network computing platform for peer-to-peer networks, which may be referred to as a peer-to-peer platform, is described herein, and the peer-to-peer name server may be built upon the novel peer-to-peer platform and/or used in peer-to-peer networking environments based upon the novel peer-to-peer platform.

In one embodiment, a peer group name server may be implemented as a peer in a peer group, and any peer in the peer group may choose to be, or alternatively may be designated as, a peer group name server. In one embodiment, a peer group name server may cache as much information, e.g. advertisements, about peers and peer groups in its region as possible. A region is a local subnet that may include one or more peers. When a new peer boots up, the peer may register with the peer group name server to advertise itself through the peer group name server, and also may discover other peers and peer groups through the peer group name server. When a peer joins or creates a peer group, it can advertise the peer group through a peer group name server. Other named elements such as content and services provided by peers and/or peer groups may also be advertised through a peer group name server.

When a peer boots up for the first time, the peer may be preconfigured with information about a peer group name server in its region. Using this information, the peer may use the peer group name server to discover other peers and peer groups that the peer group name server is aware of and/or that the peer group name server can discover. Alternatively, when a peer boots up for the first time, the peer may not be preconfigured to be aware of any peer group name server. In this case, the peer may default to use multicast discovery to discover peers, peer groups, and/or peer group name servers. If a peer group name server in its region happens to reply to the multicast query, the peer may cache in the information about the peer group name server, may register with the peer group name server, and may use the peer group name server for future discoveries.

In one embodiment, each peer group name server may maintain information (e.g. names and identifiers in a name registry or database) about other peer group name servers, thus making a network of decentralized peer group name servers. In one embodiment, there may exist a hierarchy of peer group name servers, where one peer group name server serves as the topmost peer group name server in the hierarchy. In one embodiment, a peer group name server may act as a proxy for its region. In other words, when approached by a peer in its region for discovery, the peer group name server may access other peer group name servers in other regions to discover entities (e.g. peers, peer groups, advertisements, etc.) in the other regions on behalf of the peer.

In one embodiment, a peer may ping the peer group name server periodically to inform the peer group name server that the peer is still active. In one embodiment, the peer group name server may also periodically ping peers in the peer group to inform the peers that the peer group name server is still active. When a peer resigns from a peer group, it may inform the peer group name server so that the peer group name server can update the cached information to indicate that the peer has resigned from the peer group.

In one embodiment, a peer group name server may serve as a reverse lookup provider. If a peer already is aware of a peer group, it may use a peer group name server for reverse discoveries, for example, discovering peers in the peer group. In one embodiment, if a peer is aware of another peer, it may discover the peer group(s) that the other peer is aware of by accessing the other peer's information cached on the peer group name server. In one embodiment, if a peer is aware of another peer, it may discover peer group name servers that the other peer is aware of by accessing the other peer's information cached on the peer group name server. In one embodiment, a first peer may access the peer group name server to locate a second peer and, if information that the first peer wishes to access is not cached on the peer group name server, the first peer may connect to the second peer using the peer identifier associated with the peer name to access the information from the second peer.

In one embodiment, a peer group name server may act as a registrar. In one embodiment, anyone may register an available symbolic name for peers and peer groups. In one embodiment, the peer group name server may act to reduce the chances of duplicate names. A peer group name server may maintain a database of peers, peer groups, advertisements and other entities using the entities' unique names. A peer group name server may resolve a name of a registered entity, such as a peer name or peer group name, to its associated identifier, for example a peer identifier or peer group identifier.

BRIEF DESCRIPTION OF THE DRAWINGS

FIG. 13 illustrates one embodiment of a policy advertisement;

FIG. 14 illustrates one embodiment of a peer advertisement;

FIG. 15 illustrates one embodiment of a peer group advertisement;

FIG. 16 illustrates one embodiment of a pipe advertisement;

FIG. 17 illustrates one embodiment of a service advertisement;

FIG. 18 illustrates one embodiment of a content advertisement; and

Figure 1:
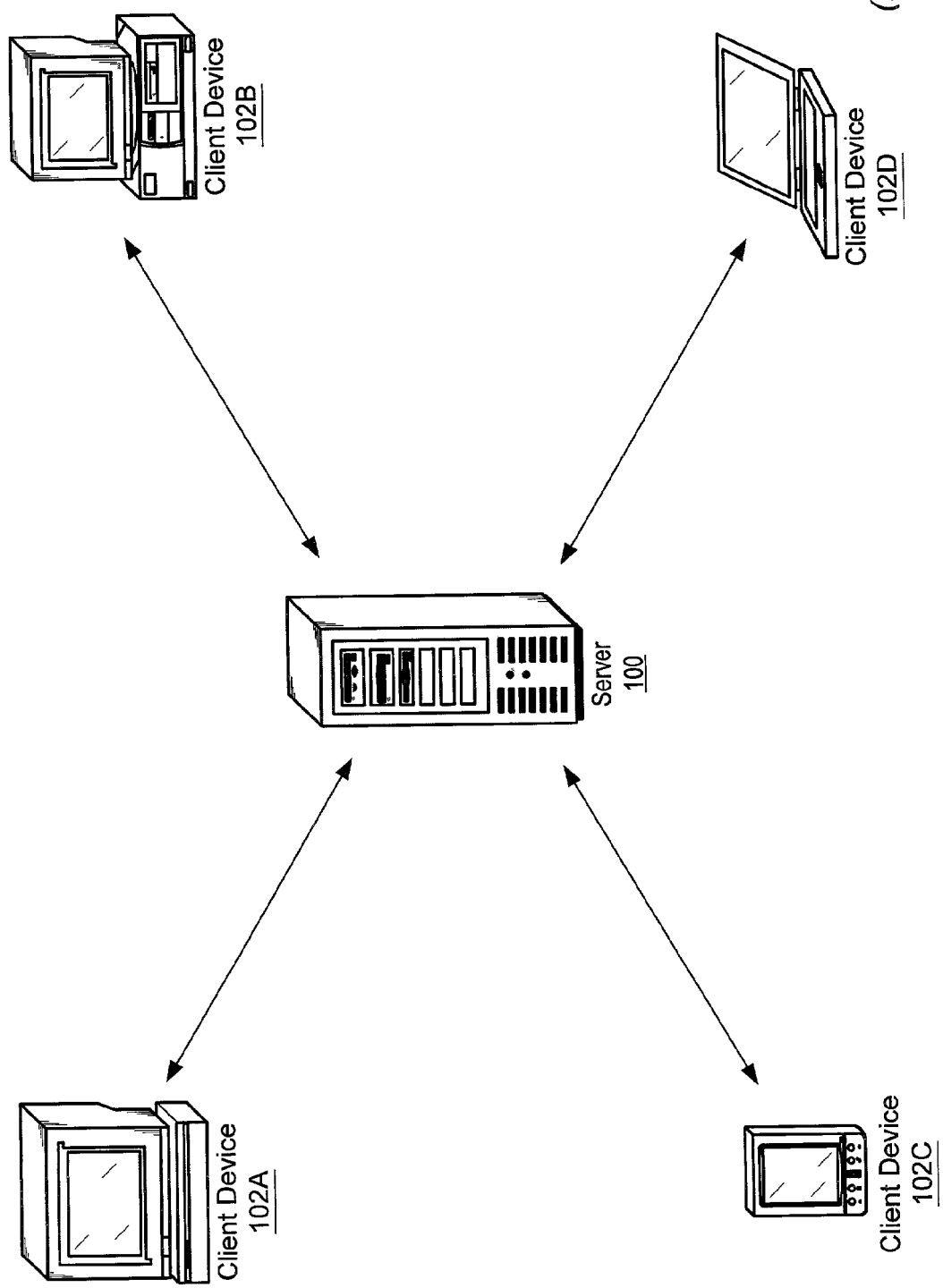
FIG. 1 illustrates an exemplary prior art client/server system.
Figure 2A:
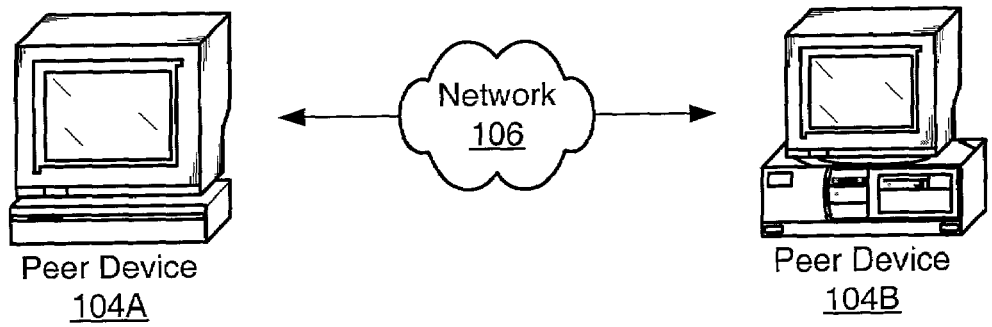
FIG. 2A illustrates a prior art example of two devices that are currently connected as peers.
Figure 2B:
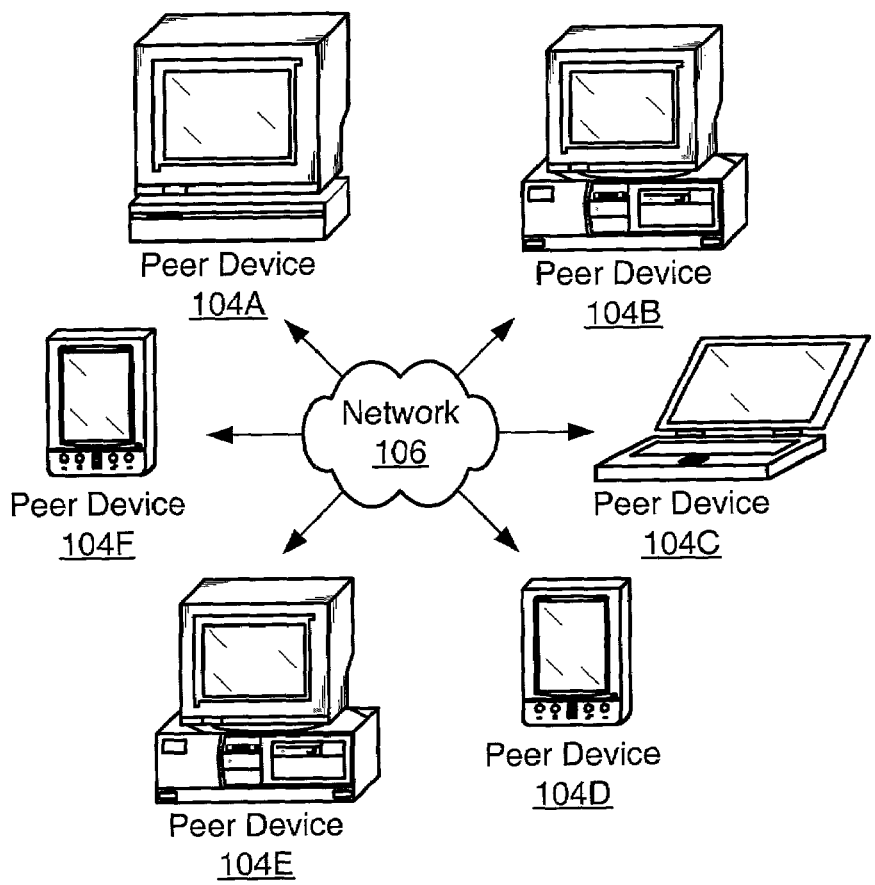
FIG. 2B illustrates a prior art example of several peer devices connected over the network in a peer group.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

A system and method for providing a name service in a peer-to-peer environment is described. In one embodiment, a peer group name server may be a standalone name server that may be used in a variety of peer-to-peer applications and environments. The peer-to-peer name server may be used in conjunction with, or alternatively may be a component of, a peer-to-peer network. A peer group name server may operate in the peer-to-peer networking environment to provide name services to entities (e.g. peers) participating in the peer-to-peer networking environment. As a name service, the peer group name server may provide a name registry that may serve as a bridge between symbolic names of entities (e.g. peers, peer groups, etc.) in the peer-to-peer networking environment and indexes or identifiers that may be used in connecting to the entities in the peer-to-peer networking environment. In one embodiment, each peer has a unique symbolic name and a unique peer identifier. In one embodiment, other entities such as peer groups, content and services may also have symbolic names and identifiers. In one embodiment, the identifiers may be dynamic. For example, a peer may be assigned a different unique identifier in different sessions on the peer-to-peer network.

A network computing platform may be used as a basis for establishing and operating a peer-to-peer networking environment. In one embodiment, the peer group name server itself may be a peer in the peer-to-peer networking environment, and thus may operate in accordance with the network computing platform. A novel open network computing platform for peer-to-peer networks, which may be referred to as a peer-to-peer platform, is described herein, and the peer-to-peer name server may be used in peer-to-peer networking environments based upon the novel peer-to-peer platform.

A peer group name server may maintain a name registry or database of peers, peer groups, and other entities using the entities' unique names. A peer group name server may resolve a name of a registered entity, such as a peer name or peer group name, to its associated identifier, for example a peer identifier or peer group identifier. For example, a peer may be aware of the names of one or more entities such as peers and peer groups, but not have knowledge of the identifiers of the entities. In one embodiment, the identifiers may be dynamically assigned to an entity when the entity joins the peer-to-peer network, and thus other entities may be aware of the entity's symbolic name (which has a low probability of being changed) but not be aware of their identifier (which has a high probability of being changed). Thus, if a peer desires to contact another entity (peer, peer group, etc.) that it knows the symbolic name of, the peer may use a peer group name server to get the (current) identifier of the entity. In one embodiment, the peer may send one or more messages to the peer group name server, where at least one of the messages includes the symbolic name of the entity it wishes to connect to. The peer group name server may use the name to locate the identifier of the entity associated with the name, and may then return the identifier to the peer (e.g. in one or more messages). The peer may then use the identifier to access the entity in the peer-to-peer network, e.g. to establish a peer-to-peer connection to a peer.

A peer group name server is preferably adaptive, distributed and decentralized. A peer group name server may perform useful functions in a peer-to-peer environment including, but not limited to:

- providing understandable unique identities to peers, peer groups and other entities;
- making the discovery process highly scalable;
- providing an adaptive name service; and
- providing reverse lookups (lookups based on names and IDs).

In one embodiment, a peer group name server may be a special peer that caches as much information about other peers and peer groups as possible. A peer group name server may address the naming of peers and peer groups, the resolution of names to identifiers and vice versa, and also may provide additional services. When a new peer boots up, the peer may advertise itself through the peer group name server, may discover other peers and peer groups through the peer group name server, and/or may use the peer group name server to resolve the names of entities of which it aware to their identifiers. When a peer joins or creates a peer group, it can advertise the peer group through a peer group name server. A peer group name server may cache advertisements and other information about peers and peer groups in its region. A region is a local subnet that may include one or more peers. A region may be viewed as a "virtual" subnet that is not necessarily defined by, and may extend across, physical boundaries such as those created by routers, bridges, switches, firewalls, etc. In one embodiment, peers may be grouped in regions based on proximity. Peer groups may be comprised entirely in a region or alternatively may extend across regions. A peer group, like a region, may be viewed as a virtual grouping of peers that may extend across physical network boundaries. Peer groups, however, are typically formed based on something the peers have in common (e.g. interest, goal, etc) rather than on proximity. Thus, a peer-to-peer networking environment may include one or more regions, with each region comprising one or more peers. A region may also include one or more peer group name servers. A region may also include, partially or wholly, one or more peer groups. In one embodiment, a peer may directly approach a peer group name server in its region, and thus a peer group name server may help to cut down on discovery time when compared to using other discovery techniques such as multicast discovery, resulting in a highly scalable peer-to-peer platform.

Figure 3:
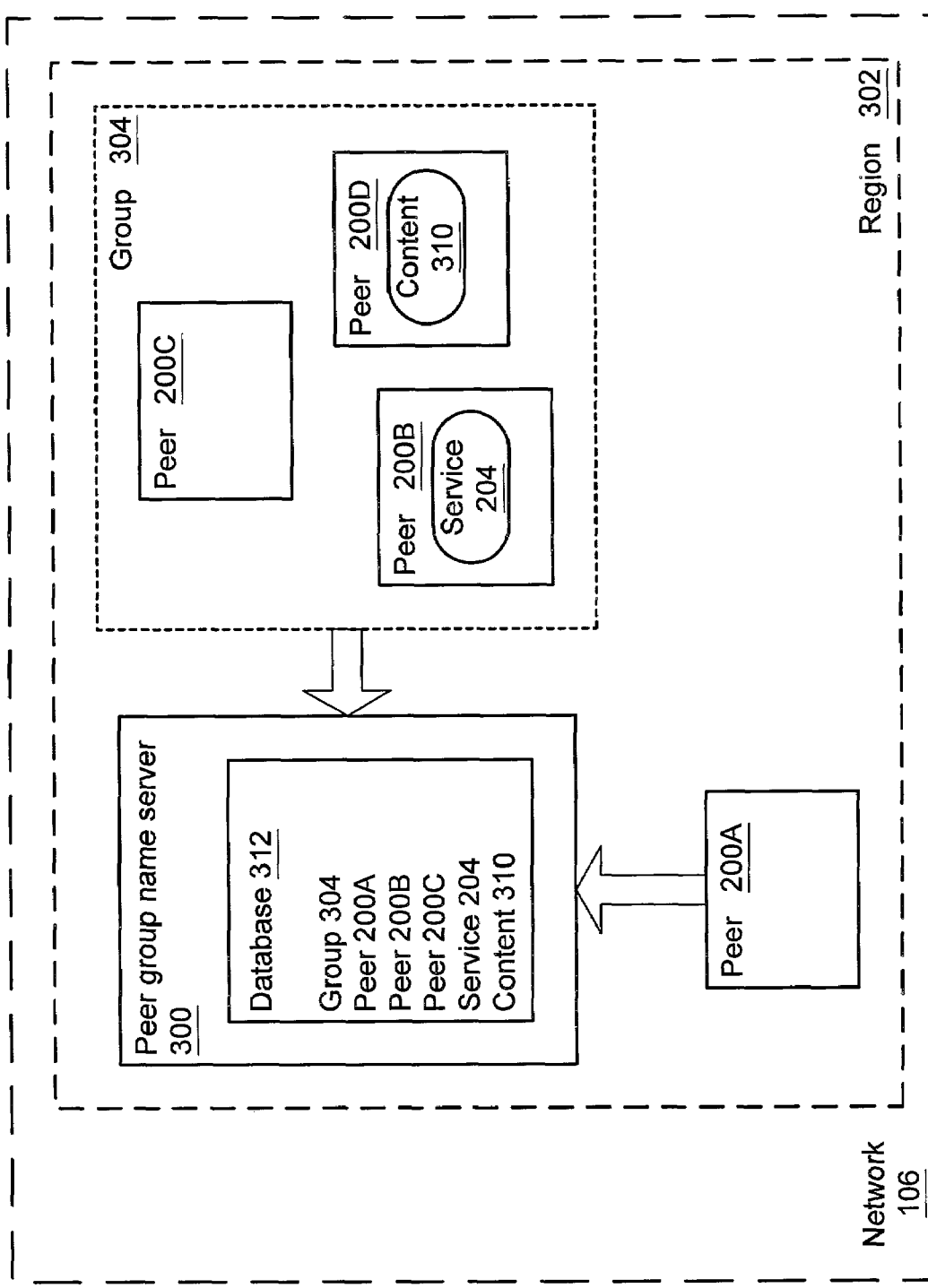
FIG. 3 illustrates an exemplary network that includes a region with peers and a peer group name server according to one embodiment.

FIG. 3 illustrates an exemplary network 106 that includes a region 302 with peers 200 and a peer group name server 300 according to one embodiment. Five network nodes are located within the region 302. The five network nodes include peers 200A, 200B, 200C and 200D. The fifth network node is serving as the peer group name server 300. Peers 200B, 200C and 200D are currently participating in a peer group 304. Note that, in one embodiment, the fifth network node may be a peer 200 in the region as well, and thus may also be a member of peer group 304. In one embodiment, Region 302 may also include one or more other peers 200 and one or more other peer groups 304. Note that, while the illustration shows peer group 304 contained entirely within region 302, in one embodiment peer groups may extend across region boundaries. Each peer 200 may have previously registered with peer group name server 300. For example, a peer 200 may register at startup of the network node on which the peer 200 is operating. When a peer 200 is registered, the peer group name server 300 may store the peer's name and peer identifier, for example in a name registry or database 312. When one or more peers 200 initiate a peer group, the peer group may also be registered with the peer group name server 300, and the peer group name and peer group identifier may be stored by the peer group name server 300. For example, the peer group name server 300 shows that peer group 304 is registered in its database. Content and services may also be registered on the peer group name server 300. For example, content 310 on peer 200D and service 204 on peer 200B are currently registered on the peer group name server 300. In one embodiment, the peer group name server 300 may store a name and associated identifier for the registered services and content.

Peers 200 may access peer group name server 300 to identify other peers 200, peer groups 304, services 204, content 310, and other named entities within the region 302. In one embodiment, peers 200 may also use peer group name server 300 to identify peers 200 and other entities within peer group 304. For example, peer 200A may access peer group name server 300 to request information on all peer groups 304 within region 302. Peer group name server 300 may respond with information about peer group 304 and other peer groups (if any) within region 302. In one embodiment, peer 200A may then use a an access method such as a peer group membership protocol 280 accessed using the information on the peer group 304 provided by the peer group name server 300 to join peer group 304. In one embodiment, a peer 200 may access a peer group name server 300 to find information on entities based upon other information, such as interest. For example, a peer 200 may send a request to a peer group name server 300 that requests the names and/or identifiers of all peer groups 304 that the peer group name server is aware of (or can find out about) that are related to baseball. In one embodiment, a peer group name server may be able to locate one or more registered entities based upon a partial string, for example, information about all entities whose name contains the partial string may be returned to the requesting peer.

Embodiments of a peer group name server-based name service may be adaptive. When a peer 200 boots up for the first time, the peer 200 may be preconfigured with information about a peer group name server 300 in its region 302. Using this information, the peer 200 may use the peer group name server 300 to discover other peers 200 and peer groups 304 that the peer group name server 300 is aware of and that the peer group name server 300 can discover. Alternatively, when a peer 200 boots up for the first time, the peer 200 may not be preconfigured to be aware of any peer group name server 300. In this case, the peer may default to use multicast discovery to discover peers 200 and/or peer groups 304. If a peer group name server 300 in its region 302 happens to reply to the multicast query, the peer 200 may cache in the information about the peer group name server 300, may register with the peer group name server 300, and may use the peer group name server 300 for future discoveries. Until a peer 200 is aware of a peer group name server 300, it may default to multicast for discovery. In one embodiment, the peer 200 may itself become a peer group name server 300.

In one embodiment, a peer group name server 300 may be implemented as a peer 200 in a peer group 304, and any peer 200 in the peer group 304 may choose to be, or alternatively may be designated as, a peer group name server 300. In one embodiment, a peer group name server 300 is not guaranteed to be available all the time. In one embodiment, a peer group name server 300 may go up or down anytime. If a peer group name server 300 is not available, a peer 200 may choose to use another peer group name server 300 that it is aware of, or alternatively may fall back to the default services provided by the peer-to-peer platform (e.g. multicast discovery).

In one embodiment, a peer group name server 300 may be scalable. Since a peer group name server 300 may cache advertisements from peers 200 and peer groups 304, the use of the peer group name server 300 may provide quicker discovery for peers 200 and peer groups 304 than prior art methods of discovery in the peer-to-peer environment. In one embodiment, a peer group name server 300 may act as a proxy for its region 302. For example, a peer group name server X is deployed in region M and a peer group name server Y is deployed in a region N. A new peer in region M may approach peer group name server X for discovery. Peer group name server X may reply back to the peer, and in addition peer group name server X may approach peer group name server Y for discovery in region N and so on, cutting down on multicasts in region M as well as region N. Also, in the process, peer group name server X may cache info about all the peers 200 and peer groups 304 in the region N.

In one embodiment, a peer group name server 300 may be kept in synchronization with entities in its region 302. When a new peer 200 boots up, it may inform a peer group name server 300 in its region 302. The peer group name server 300 caches information about this peer 200. The peer group name server 300 may cache as much information as possible to make the peer-to-peer platform highly scalable. In one embodiment, information about peers 200 and their peer groups 304 may be cached. When a peer 200 joins or creates a peer group 304, it may advertise to the peer group name server 300 so that the peer group name server 300 can keep track of what peers 200 are in the peer group 304. In one embodiment, a peer 200 may ping the peer group name server 300 periodically to inform the peer group name server 300 that the peer 200 is still active. In one embodiment, the peer group name server 300 may also periodically ping peers 200 in the peer group 304 to inform the peers 200 that the peer group name server 300 is still active. When a peer 200 resigns from a peer group 304, it may inform the peer group name server 300 so that the peer group name server 300 can update the cached information to indicate that the peer 200 has resigned.

In one embodiment, each peer 200 may be aware of at most n peer group name servers 300, where n is a positive integer and is a limit on the number of peer group name servers 300 that a peer 200 can be aware of. For example, a peer 200 may first approach peer group name server X. If peer group name server X does not respond, the peer may approaches peer group name server Y, and so on until a peer group name server 300 is found or the peer 200 has approached all peer group name servers 300 it is aware of without getting a response. In one embodiment, if the peer

200 does not get a response from any peer group name server 300 that it is aware of, the peer 200 may default to multicast to discover peers 200, peer groups 304 and potentially other peer group name servers 300 that it is not currently aware of. In one embodiment, each peer group name server 300 may also maintain information about other peer group name servers 300, thus making a network of decentralized peer group name servers 300. In one embodiment, there may exist a hierarchy of peer group name servers 300, where one peer group name server 300 serves as the topmost peer group name server 300 in the hierarchy.

Figure 4:
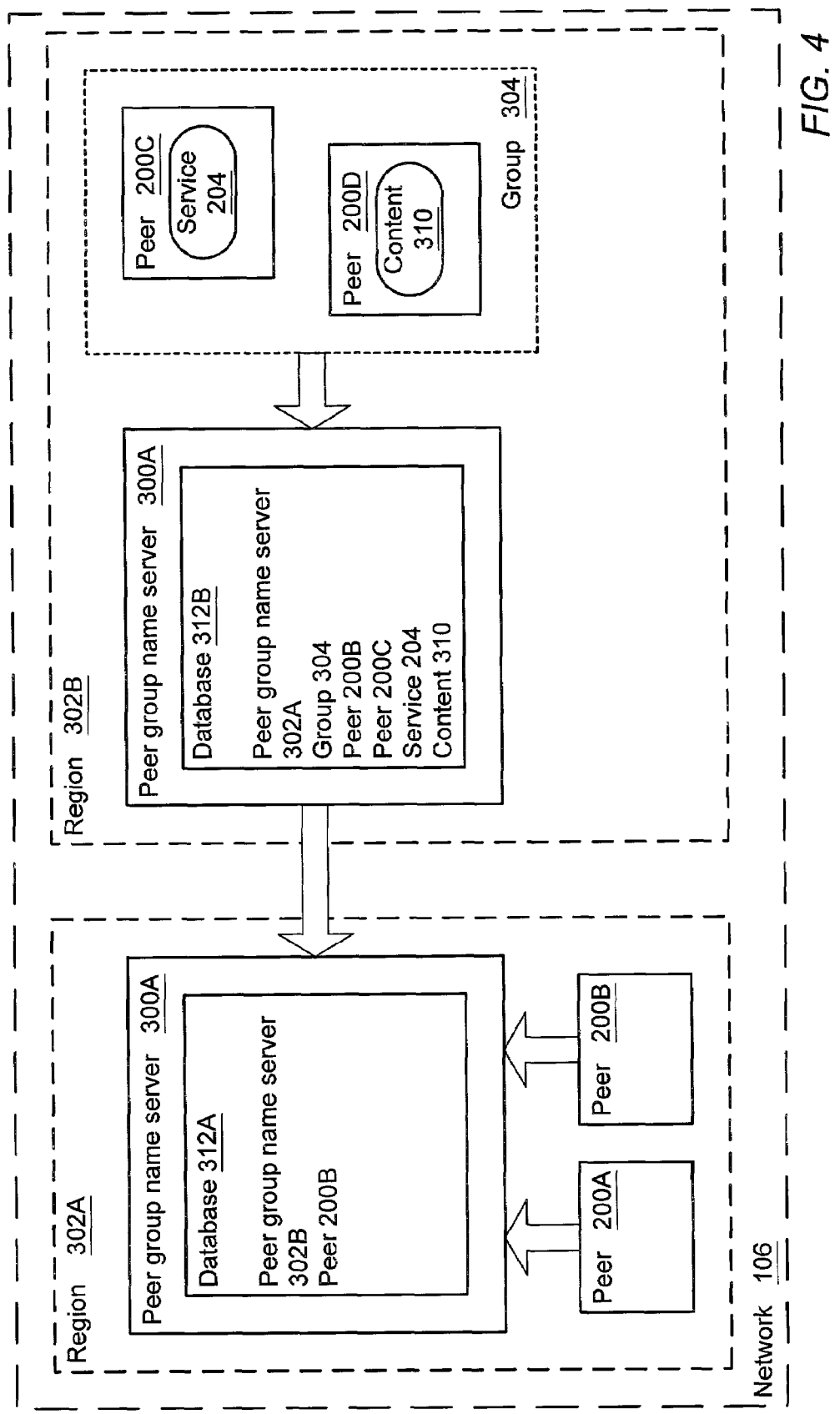
FIG. 4 illustrates an exemplary network that includes two regions according to one embodiment.

FIG. 4 illustrates an exemplary network 106 that includes two regions 302A and 302B according to one embodiment. Region 302A comprises a peer group name server 300A and peers 200A and 200B. Region 302B comprises a peer group name serve 300B and a peer group 304 comprising peers 200C and 200D. Database 312A on peer group name server 300A includes information about peer group name server 300B. Peer group name server 300A also includes information about peer 200B. Database 312B on peer group name server 300B includes information about peer group name server 300A. Database 312B on peer group name server 300B also includes information about group 304, peers 200C and 200D, service 204 on peer 200C, and content 310 on peer 200D. Peer 200A may access peer group name server 300A to discover peers 200, peer groups 304, and other entities in its region 302A without having to perform a multicast discovery. Peer 200A may also access peer group name server 300A to discover other peer group name servers 300 that peer group name server 300A is aware of (i.e. is storing information on in database 312A). Thus, peer 200A may discover peer group name server 300B by accessing peer group name server 300A. Peer 200A may then access peer group name server 300B to discover entities in region 302B.

In one embodiment, peer 200A may initiate a discovery on peer group name server 300A to discover peers 200, peer groups 304, and/or other entities. Peer group name server 300A may return information on any requested types of entities in region 302A that it is aware of. Since peer group name server 300A is aware of peer group name server 300B, peer group name server 300A may initiate a discovery on peer group name server 300B, receive in return information from peer group name server 300B on any requested types of entities that peer group name server 300B is aware of, and forward the information to peer 200A.

In one embodiment, a peer group name server 300 may serve as a reverse lookup provider. If a peer 200 already is aware of a peer group 304, it may use a peer group name server 300 for reverse discoveries, for example, discovering peers 200 in the peer group 304. For example, a peer 200A may be aware of a peer group 304A that is registered on a peer group name server 300A. The peer 200A may look up the peer group 304A using its peer group name and/or peer group identifier. The peer group name server 300A may cache information about the peer group 304A that may be provided to the peer 200A. The cached information may include peer names and/or peer IDs of peers 200 that belong to peer group 304A. In one embodiment, if a peer is aware of another peer 200, it may discover the peer group(s) 304 that the other peer 200 is aware of by accessing the other peer's information cached on the peer group name server 300. In one embodiment, if a peer 200 is aware of another peer 200, it may discover peer group name servers 300 that the other peer 200 is aware of by accessing the other peer's information cached on the peer group name server 300. Other entities the peer group name server 300 may be aware of (e.g. services, content, etc.) may also be discovered using the reverse lookup capabilities provided by the peer group name server 300.

In one embodiment, a peer group name server 300 may act as a registrar. In one embodiment, anyone may register an available name for peers 200 and peer groups 304. In one embodiment, the peer group name server 300 may act to reduce the chances of duplicate identities. In one embodiment, a peer group name server 300 may maintain a database of names already in use. If the peer group name server 300 receives a request to assign a new name to a peer 200, peer group 304, or other entity, and the name is already being used, the peer group name server 300 may reject the request.

Figure 5:
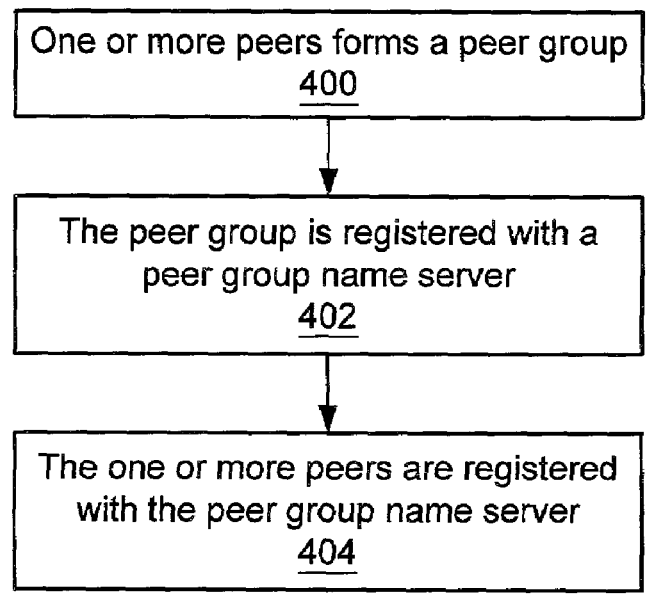
FIG. 5 is a flowchart illustrating a method of registering with a peer group name server according to one embodiment.

FIG. 5 is a flowchart illustrating a method of registering with a peer group name server 300 according to one embodiment. As indicated at 400, one or more peers 200 may form a peer group 304. As indicated at 403, the peer group 304 may be registered with a peer group name server 300. At least one of the peers 200 that formed the peer group 304 may be aware of the peer group name server 300 and may send one or more messages to the peer group name server 300 to inform the peer group name server 300 of the new peer group 304. Alternatively, a peer group name server 300 with which the peer group may be registered may be discovered from another peer group name server 300, or alternatively may be discovered from another peer 200 that is not part of the peer group 304. If no peer 200 in the peer group 304 is aware of a peer group name server 300 with which the group 304 may be registered, a discovery method such as multicast discovery may be used to discover one or more peer group name servers 300 with which the peer group 304 may be registered. In one embodiment, the peer group 304 may be registered with more than one peer group name server 300. In one embodiment, one of the peers 200 may be designated as or may choose to serve as a peer group name server 300, and the peer group 304 may be registered with it. For example, if no peer group name server 300 exists in the region 302, one of the peers 200 may choose to serve as a peer group name server 300 for the peer group 304.

The messages sent to the peer group name server 300 may include information on the new peer group including, but not limited to, a peer group name and a peer group identifier. Alternatively, the peer group name server 300 may assign a peer group identifier to the new peer group 304. If the peer group name is already in use or otherwise unacceptable, the peer group name server 300 may reject the name and request that a new peer group name be chosen. Alternatively, the peer group name server 300 may assign a different peer group name if the peer group name is already in use or otherwise unacceptable. Information provided to the peer group name server 300 may also include more detailed information on the purpose of the peer group 304 that may be used by other peers 200 to determine if they have interest in joining the peer group. Information provided to the peer group name server 300 may also include information on the one or more peers 200 that are members of the peer group 304. In one embodiment, the information provided to the peer group name server 300 may also include one or more protocols to be used in the peer group 304. In one embodiment, the information provided to the peer group name server 300 may include a peer group membership protocol that may be used by other peers 200 who wish to join the peer group 304. The peer group name server 300 may store as much of the received information as possible about the peer group 304 for use by other entities (e.g. other peers 200) for discovery and/or name resolution using the peer group name server 300.

As indicated at 404, the one or more peers 200 that formed the peer group may also be registered with the peer group name server 300. One or more messages may be sent to the peer group name server 300 that may include information on the peers 200 including, but not limited to, a peer name and a peer identifier for each peer 200. Alternatively, the peer group name server 300 may assign a peer identifier to the peer 200. If the peer name is already in use or otherwise unacceptable, the peer group name server 300 may reject the name and request that a new peer name be chosen.

Information on a peer 200 provided to the peer group name server 300 may also include information on services and/or content available on the peer 200. Using this information on content and/or services of a peer 200, the content and/or services may themselves be registered with the peer group name server 300. Using this information, a peer 200 may discover content and/or services that it wishes to access, and may reverse lookup one or more peers 200 that include the content and/or services. The peer 200 may then reverse lookup the peer group 304 that a particular peer 200 belongs to and attempt to join the peer group 304 to gain access to the content and/or services. Alternatively, the peer 200 may form a peer-to-peer connection with another peer 200 to share content and/or services with the peer 200. As another alternative, the peer 200 may choose to form a peer group 304 with one or more other peers 200 discovered through the reverse lookup.

Figure 6:
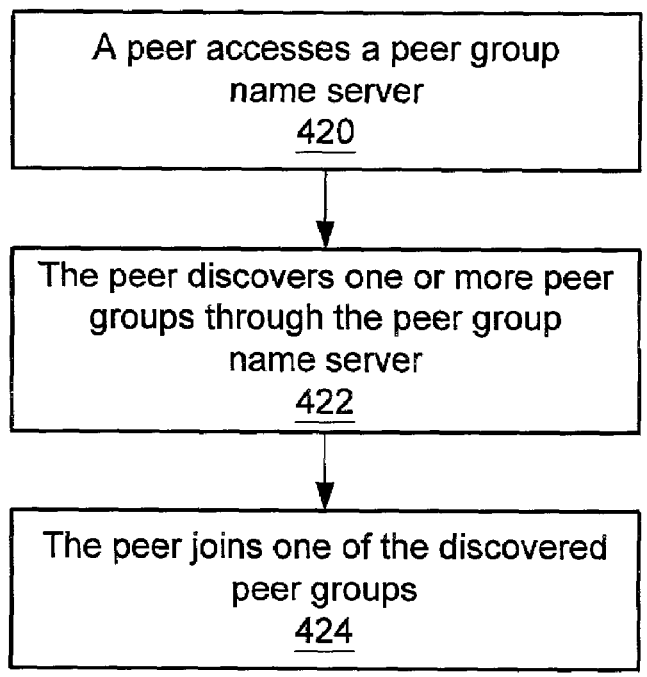
FIG. 6 is a flowchart illustrating a method of peer group discovery using a peer group name server according to one embodiment.

FIG. 6 is a flowchart illustrating a method of peer group 304 discovery using a peer group name server 300 according to one embodiment. A peer 200 may access a peer group name server 300 as indicated at 420. Accessing the peer group name server 300 may include sending information in one or more messages to the peer group name server 300. In one embodiment, accessing the peer group name server 300 may include initiating and/or establishing a connection on the network (e.g. a peer-to-peer connection) between the peer 200 and the peer group name server 300. Information may then be exchanged between the peer 200 and the peer group name server 300 on the connection. In one embodiment, the information is exchanged in message format, for example Datagram messages.

The peer 200 may be previously aware of the peer group name server 300. For example, access information for the peer group name server 300 may be stored in nonvolatile memory on the network node on which the peer 200 resides. Alternatively, the peer 200 may discover the peer group name server 300 prior to accessing. For example, the peer 200 may have obtained information on the peer group name server 300 from another peer 200, from another peer group, or from another entity on the network. As another example, the peer 200 may use another discovery method such as multicast discovery to discover the peer group name server 300.

As indicated at 422, the peer 200 may discover one or more peer groups 304 through the peer group name server 300. In one embodiment, the peer 200 may send one or more messages to the peer group name server 300 to initiate a discovery. The peer group name server 300 may return one or more messages that may include some or all of the information about some or all peer groups 304, if any, that the peer group name server 300 is aware of (e.g. that it has stored or cached information about). In one embodiment, the peer group name server 300 may also access one or more other peer group name servers 300 that it is aware of to discover other peer groups 304, if any, that the other peer group name servers 300 are aware of. The peer group name server 300 may then provide any information on the other peer groups 304 discovered from the other peer group name servers 300 to the peer 200. As indicated at 424, the information on the discovered peer groups 304 received from the peer group name server 300 may be examined to determine if there is a peer group 304 that the peer 200 wishes to join. The peer 200 may then choose to join a selected peer group 304.

Figure 7:
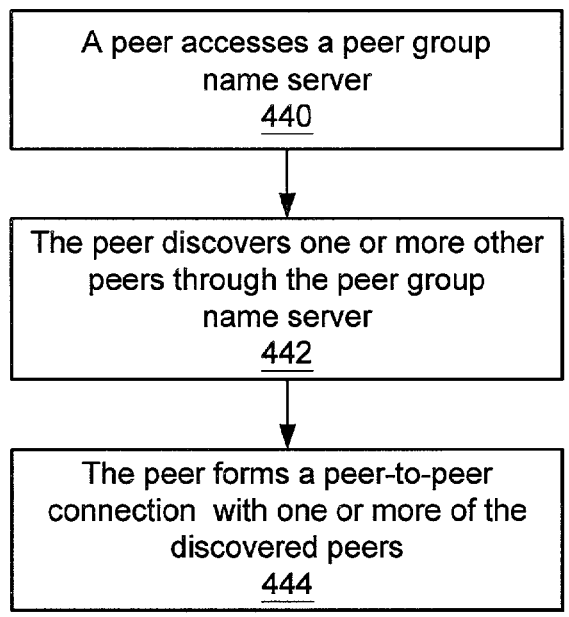
FIG. 7 is a flowchart illustrating a method of peer discovery using a peer group name server according to one embodiment.

FIG. 7 is a flowchart illustrating a method of peer discovery using a peer group name server 300 according to one embodiment. Peers 200 in a peer group 200 may be registered with a peer group name server 300. Peers 200 that are not part of a peer group 304 may also register with the peer group name server 300. Thus, the peers 200 may become available for discovery by other peers 200 which, for example, may wish to share content and/or services with the discovered peers 200 in the peer-to-peer environment, to form a peer group 304 that includes one or more of the discovered peers 200, or to invite one or more of the discovered peers to join an existing peer group 304.

As indicated at 440, a peer 200 may access the peer group name server 300. As indicated at 442, the peer may discover one or more other peers 200 through the peer group name server 300. The peer 200 may then connect with one or more of the discovered peers 200 as indicated at 444, if desired. For example, the peer 200 may form a peer-to-peer connection with a discovered peer 200 to access content and/or services of the peer 200. Alternatively, the peer 200 may choose to form a peer group 304 with one or more of the discovered peers 200. The peer 200 may also choose to reverse lookup the peer group 304 that a discovered peer 200 belongs to and attempt to join the peer group 304.

Figure 8:
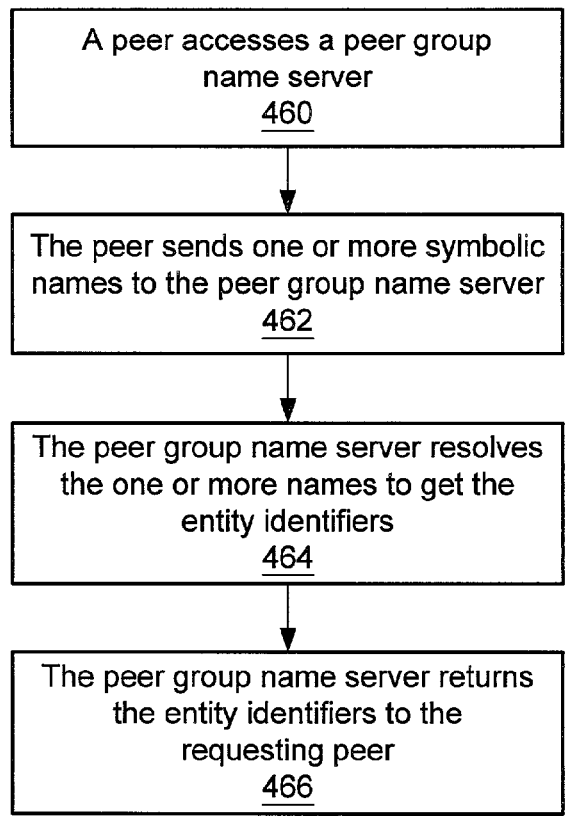
FIG. 8 is a flowchart illustrating a method of symbolic name resolution using a peer group name server according to one embodiment.

FIG. 8 is a flowchart illustrating a method of symbolic name resolution using a peer group name server 300 according to one embodiment. Peers 200 in a peer group 200 may be registered with a peer group name server 300. Peers 200 that are not part of a peer group 304 may also register with the peer group name server 300. Thus, the peers 200 may become available for discovery by other peers 200 which, for example, may wish to share content and/or services with the discovered peers 200 in the peer-to-peer environment, to form a peer group 304 that includes one or more of the discovered peers 200, or to invite one or more of the discovered peers to join an existing peer group 304.

As indicated at 460, a peer 200 may access the peer group name server 300. The peer may be aware of the symbolic names of one or more other entities. As indicated at 462, the peer may send the symbolic names of one or more entities to the peer group name server 300. As indicated at 462, the peer group name server 300 may look up the one or more symbolic names in a name registry or database of names in which it stores symbolic names and associated identifiers of all entities of which it is aware (e.g. that have registered with the peer group name server 300). The peer group name server may then return any identifiers associated with the symbolic names that it has located in the database to the requesting peer 200 as indicated at 464. The peer 200 may then connect with one or more of the discovered peers 200, if desired. For example, the peer 200 may form a peer-to-peer connection with a peer 200 whose identifier was returned to access content and/or services of the peer 200. As another example, the peer 200 may choose to join a peer group 304 whose identifier was returned.

The methods as described in FIGS. 5 through 8 may be implemented in software, hardware, or a combination thereof. The order of method may be changed, and various steps may be added, reordered, combined, omitted, modified, etc.

Peer-to-Peer Platform

Instead of deploying a single set of software (an OS, with its device drivers, and applications) on many hardware platforms, the peer-to-peer platform described herein creates a protocol-based network platform. This approach allows many network nodes to adopt one or more of the protocols of the platform. A "network node" is a node on the network that may participate in (i.e. be a peer in) the peer-to-peer network platform. The peer-to-peer platform may provide infrastructure services for peer-to-peer applications in the peer-to-peer model. The peer-to-peer platform may provide a set of primitives (infrastructure) for use in providing services and/or applications in the peer-to-peer distributed fashion. The peer-to-peer platform may provide mechanisms with which peers may find each other, cooperate with each other, and communicate with each other. Software developers may use the peer-to-peer platform as a standard to deploy interoperable applications, services and content. Thus, the peer-to-peer platform may provide a base on which to construct peer-to-peer network computing applications on the Internet.

The peer-to-peer platform may provide a mechanism for dynamically creating groups and groups of groups. The peer-to-peer platform may also provide mechanisms for peers to discover (become aware of) other peers and groups, and mechanisms for peers and/or peer groups to establish trust in other peers and/or peer groups 304. The peer-to-peer platform may also provide a mechanism for monitoring peers and peer groups 304, and for metering usage between peers and peer groups 304. The peer-to-peer platform may also provide a mechanism for tracking peers and peer groups 304, and for establishing a control policy between peers and in peer groups 304. The peer-to-peer platform may also provide a security layer for verifying and authorizing peers that wish to connect to other peers or peer groups 304.

In one embodiment, peers (and therefore the entire collective platform of peers) may be defined by:
 a set of protocols implemented, and used by the peer;
 an underlying software platform and network transports used by the peer;
 rules and conventions governing the peer's role in the platform; and
 a set of resources produced (exported to others) and consumed (imported from others) by the peer.

The peer-to-peer platform protocols may provide inter-operability between compliant software components (executing on potentially heterogeneous peer runtimes). The term compliant may refer to a single protocol or multiple protocols. That is, some peers may not implement all the defined protocols. Furthermore, some peers may only use a portion (client-side or server-side only) of a particular protocol. The protocols defined by the peer-to-peer protocol may be realized over a network. Networks that may support the peer-to-peer platform protocols may include, but are not limited to, wireless and wired networks such as the Internet, a corporate intranet, Local Area Networks (LANs), Wide Area Networks (WANS), and dynamic proximity networks. One or more of the protocols of the peer-to-peer platform may also be used within a single computer. The size and complexity of the network nodes supporting these protocols may range from a simple light switch to a complex, highly available server and even to mainframe and supercomputers.

In one embodiment, the distance, latency, and implementation of peer software is not specified by the peer-to-peer platform protocols, only a common discovery and communication methodology, creating a "black box" effect. The definitions of protocol and peer software implementation issues may be referred to as a binding. A binding may describe how the protocols are bound to an underlying network transport (like TCP/IP or UDP/IP) or to a software platform such as UNIX or Java.

Peers that wish to cooperate and communicate with each other via the peer-to-peer platform may do so by following a set of rules and conventions called a policy. Each policy may orchestrate the use of one or more protocols operating on a set of platform resources. A common policy adopted by peers with different implementations may allow the peers to appear as a single distributed system. The policies may range from tightly-coupled to loosely-coupled policies. Tightly-coupled policies may create tightly-coupled systems. Loosely-coupled policies may create loosely coupled systems. The policies may rely on the set of protocols provided by the peer-to-peer platform. In one embodiment, some policies may be standard and operate in a wide variety of deployments. These standard policies may be referred to as the peer-to-peer platform standard policies. In one embodiment, custom policies may be supported. Policies may offer a means of tailoring the peer-to-peer platform to a problem, using centralized, decentralized, or hybrid approaches where appropriate. In one embodiment, these policies may be made open to all vendors, software developers, and IT managers as a means of adapting peer-to-peer platform to a networking environment and to the problem at hand.

In one embodiment, the peer-to-peer platform core protocols may be decentralized, enabling peer-to-peer discovery and communication. One embodiment provides standard plug-in policy types that may offer the ability to mix-in centralization as a means of enabling
 Efficient long-distance peer lookup and rendezvous using peer naming and discovery policies;
 Simple, low-cost information search and indexing using sharing policies; and
 Inter-operability with existing centralized networking infrastructure and security authorities in networks such as corporate, public, private, or university networks using administration policies.

In one embodiment, a network node using the peer-to-peer platform (i.e. a peer) may provide one or more advertisement documents. Each advertisement document may represent a resource somewhere on the peer, or even on another device or peer. In one embodiment, all advertisement documents may be defined in a markup language such as XML and therefore may be software platform neutral. Each document may be converted to and from a platform specific representation such as a Java object. The manner in which the conversion takes place may be described in the software platform binding.

In one embodiment, the peer-to-peer platform may allow software implementation issues to be dealt with by the underlying software platform (e.g. Java, UNIX, or Windows). The combination of standard policies, platform resource advertisements, and flexible binding practices may yield a flexible system that may scale to Internet proportions.

In one embodiment, the peer-to-peer platform architecture may be defined in terms of its protocols, resource advertisements, and standard policies. The peer-to-peer platform protocols may be realized within various software platforms, such as the Java platform. Network protocol bindings may serve to ensure inter-operability with existing content transfer protocols, network transports, routers, and firewalls. Software platform bindings may describe how protocol stacks are implemented, and how advertisements are converted to and from language constructs (such as objects) that represent the advertised resource (such as a peer group). In one embodiment, the Java platform may be used to create Java-based peer-to-peer platform peers. HTTP is a common reliable content transfer protocol that may be used in the peer-to-peer platform. Other content transfer protocols may also be supported. TCP is a common reliable connection protocol that may be used in the peer-to-peer platform. Other connection protocols may also be supported. UDP is a common Datagram message protocol that may be used in the peer-to-peer platform. Other message protocols may also be supported.

The peer-to-peer platform may mold distinct network nodes called peers into a coherent, yet distributed peer-to-peer network computing platform. In preferred embodiments, the platform may have no single point of configuration, no single point of entry, and no single point of failure. In one embodiment, the peer-to-peer network computing platform may be completely decentralized, and may become more robust as it expands through the addition of network nodes. Unlike tightly-coupled systems, the high level of robustness delivered by peer-to-peer platform may be achieved without sacrificing simplicity. The peer-to-peer platform may be a very simple platform that preferably does not rely on high-speed interconnects, complex operating systems, large disk farms, or any other technology on which traditional tightly-coupled systems rely.

Network nodes (called peers) of various kinds may join the platform by implementing one or more of the platform's protocols. Various nodes including, but not limited to, Java, SPARC, x86, PowerPC, and ARM-based nodes may all be placed on an equal footing as "peers", with no one node type favored over any other node type. Each peer may operate independently of any other peer, providing a degree of reliability not commonly found in tightly-coupled homogeneous systems. Peers may discover each other on the network in order to form loosely-coupled relationships.

Peers may contain software components that act as clients and services that request and provide platform functions respectively. A software component may act as a client, a service, or both. The peer-to-peer platform may recognize different kinds of software components within a peer including, but not limited to:

policies—a policy is a named behavior, rule, or convention that is to be followed by each member of a peer group (may or may not be loadable from the network and/or a storage medium such as a disk);

clients—a client is a software component that may request a platform function by invoking a protocol;

services—a service is a named, loadable library of code providing a platform function, a service may be viewed as a means of encapsulating a policy implementation; and applications—an application is a named, loadable service that interacts with a user, for example using a GUI.

Figure 9:
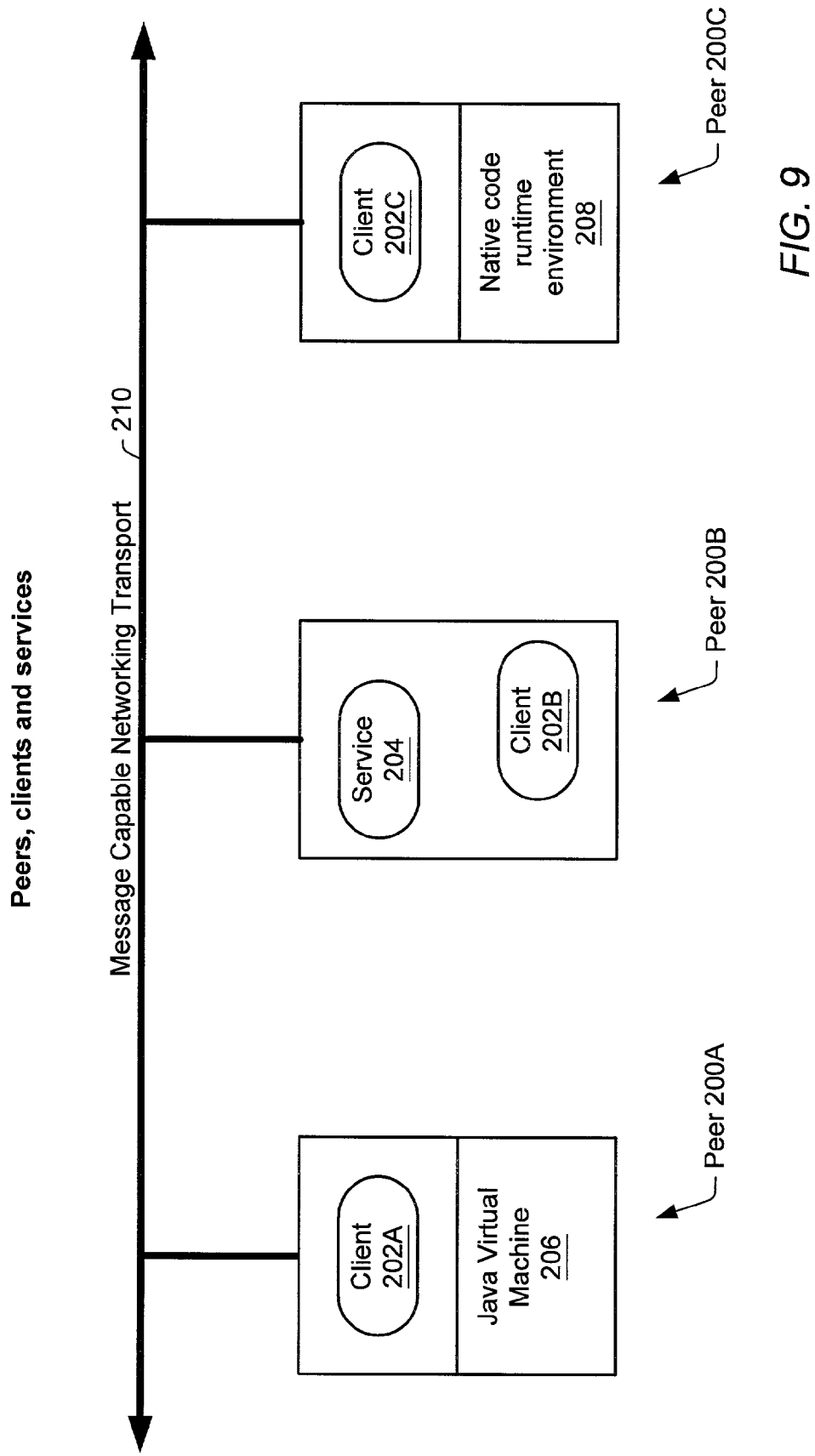
FIG. 9 illustrates an example of several peers in a peer-to-peer network according to one embodiment.

FIG. 9 illustrates an example of several peers 200 in a peer-to-peer network according to one embodiment. Peer 200A may be executing a Java Virtual Machine (JVM) 206, and client 202A may be executing on the JVM 206. Peer 200C may be executing a native code runtime environment 208, and client 202C may be executing within the environment 208. Peer 200B may include a client 202B and a service 204. Peer 200B may provide advertisement to service 204. Clients 202A and 202C may request and, if authorized, be granted access to service 204. Client 202B may also access service 204.

In one embodiment, peer-to-peer protocols may be embodied as markup language (e.g. XML) messages sent between peer software components acting as clients and services. Peer-to-peer platform messages may define the protocol used to connect the components, and may also be used to address resources offered by the component. The use of policies and messages to define a protocol allows many different kinds of nodes to participate in the protocol. Each node may be free to implement the protocol in a manner best suited to the node's abilities and role(s). For example, not all nodes may be capable of supporting a Java runtime environment; the protocol definition may not require or imply the use of Java on a node.

In one embodiment, the peer-to-peer platform may use markup language (e.g. XML) messages as a basis for providing Internet-scalable peer-to-peer communication. Each peer's messaging layer may asynchronously deliver an ordered sequence of bytes from client to service, using a networking transport. The messaging layer may maintain the notion (on both client and service) that the sequence of bytes is one atomic unit. In one embodiment, messages are sent to endpoints. An endpoint is a destination (e.g. a Uniform Resource Identifier (URI)) on any networking transport capable of sending and receiving Datagram-style messages. In one embodiment, the peer-to-peer platform does not assume that the networking transport is IP-based. The messaging layer may use the transport specified by the URI to send and receive messages. Both reliable connection-based transports such as TCP/IP and unreliable connectionless transports like UDP/IP may be supported. Other message transports such as IRDA, and emerging transports like Bluetooth may also be supported by using this endpoint addressing scheme.

In one embodiment, peer-to-peer platform messages are Datagrams that may contain an envelope, a stack of protocol headers with bodies, and an optional trailer. In one embodiment, the envelope may contain a header, a message digest, a source endpoint (optional), and destination endpoint. In on embodiment, each protocol header includes a <tag> naming the protocol in use and a body length. In one embodiment, a protocol body may have a variable length amount of bytes that is protocol <tag> dependent. In one embodiment, a protocol body may include one or more credentials used to identify the sender to the receiver. In one embodiment, a variable-length trailer (could be zero) consisting of auditing information may be piggybacked on a message. The trailer size may be computed by subtracting the body size and envelope size from the total size specified in the envelope. In one embodiment, the right to piggyback trailer information may be regulated by the messaging credentials in the message. When an unreliable networking transport is used, each message may be delivered once to the destination, may be delivered more than once to the destination, or may not arrive at the destination. On an unreliable networking transport, messages may arrive at a destination in a different order than sent.

Policies, applications and services layered upon the core protocols are responsible for message reordering, duplicate message removal, and for processing acknowledgement messages that indicate some previously sent message actually arrived at a peer. Regardless of transport, a message may be unicasted (point-to-point) between two peers. Messages may also be broadcasted (like a multicast) to a peer group. In one embodiment, no multicast support in the underlying transport is required.

One embodiment of a peer-to-peer protocol may support credentials in messages. A credential is a key that, when presented in a message body, is used to identify a sender and to verify that sender's right to send the message to the specified endpoint. The credential is an opaque token that may be presented each time a message is sent. The sending address placed in the message envelope may be cross-checked with the sender's identity in the credential. In one embodiment, credentials may be stored in the message body on a per-protocol <tag> basis. In one embodiment, each credential's implementation may be specified as a plug-in policy, which may allow multiple authentication policies to coexist on the same network.

Figure 10:
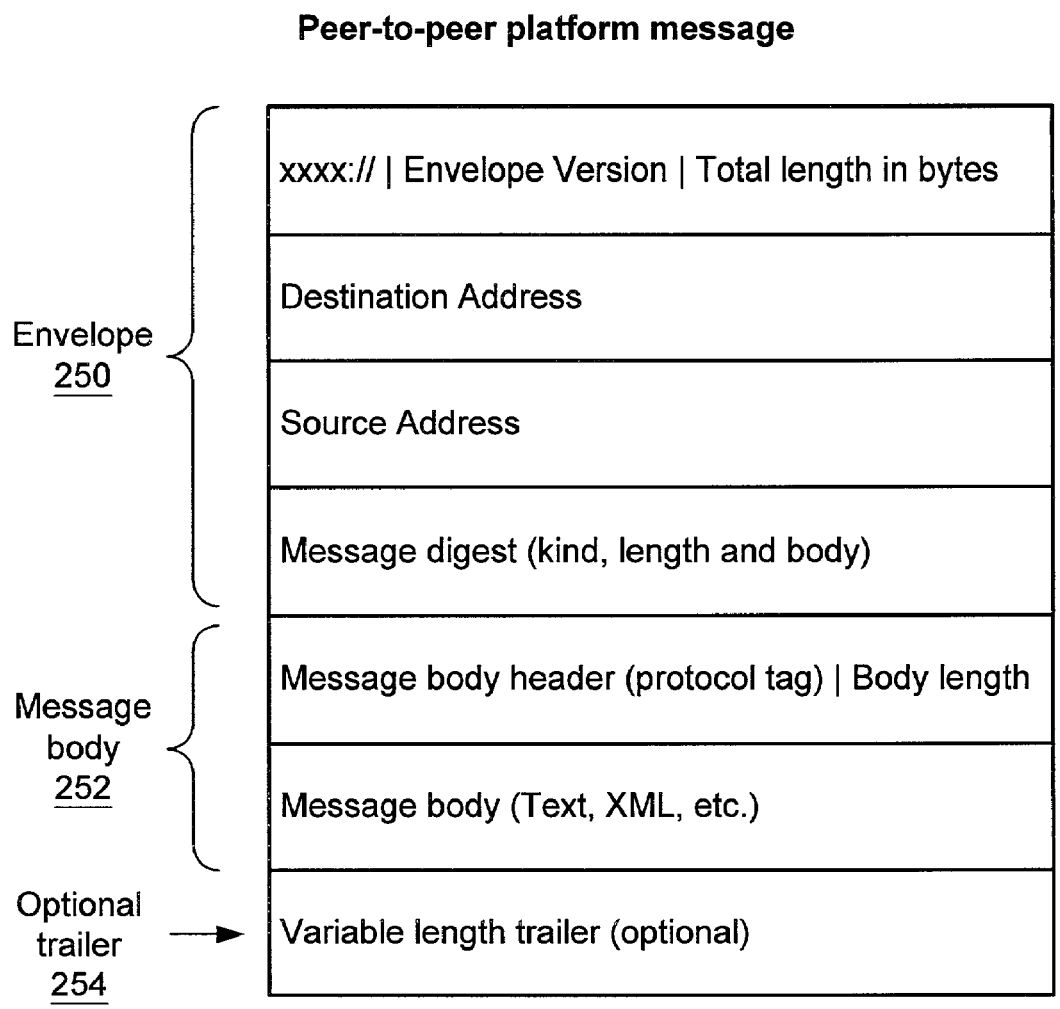
FIG. 10 illustrates a message with envelope, message body, and optional trailer according to one embodiment.

In one embodiment, peer-to-peer platform messages may be defined in a markup language such as XML. FIG. 10 illustrates a message with envelope 250, message body 252, and optional trailer 254 according to one embodiment. A message may include multiple message bodies 252.

The peer-to-peer platform may provide pipes for information exchange between peers. A pipe encapsulates a message-based protocol and a dynamic set of endpoints. In one embodiment, a pipe requires that the encapsulated protocol be unidirectional, asynchronous, and stateless. Pipes connect one or more peer endpoints. In one embodiment, at each endpoint, software to send or receive, as well as to manage associated queues or buffers, is assumed, but not mandated. These pipe endpoints may be referred to as pipe input and output endpoints. In one embodiment, a pipe may be associated with a group and not with individual peers. Peer communication endpoints (both input and output) may be bound and unbound from a pipe in a dynamic fashion, providing an abstract "in and out" mailbox that is independent of any single peer. When a message is sent into a pipe, the message may be sent to all peer endpoints currently connected (listening) to the pipe. In one embodiment, the set of currently connected endpoints may be obtained using a pipe resolver protocol. In one embodiment, a pipe may offer point-to-point communication. A point-to-point pipe connects two peer endpoints together, i.e. an input endpoint that receives messages sent from the output endpoint. In one embodiment, no reply operation is supported. Additional information in the message payload (like a unique identifier) may be needed to thread message sequences. In one embodiment, a pipe may offer broadcast communication. A broadcast pipe may connect multiple input and output peer endpoints together. Messages flow into the pipe from output endpoints and pass by listening input endpoints. A broadcast message is sent to all listening endpoints simultaneously. This process may actually create multiple copies of the message to be sent. In one embodiment, when peer groups map to underlying physical subnets in a one-to-one fashion, transport multicast may also be used as an implementation optimization provided by pipes.

In a peer-to-peer network platform, peers may cooperate and communicate in peer groups that follow rules and conventions known as policies. Each cooperation or communication policy may be embodied as a named behavior, rule, or convention that may be followed by each member of a peer group. The behavior is typically encapsulated in a body of code packaged, for example, as a dynamic link library (DLL) or Java Archive (JAR) file, but any embodiment is allowed. In one embodiment, a policy name may include a canonical name string and a series of descriptive keywords that uniquely identifies the policy. In order to use a policy, a peer may locate an implementation suitable for the peer's runtime environment. Multiple implementations of the same policy allow Java and other non-native peers to use Java (or other) code implementations, and native peers can use native code implementations. In one embodiment, a standard policy resolver protocol may be used to find active (i.e. running on some peer) and inactive (i.e. not running, but present on some peer) implementations. In one embodiment, once an implementation has been activated, the policy resolver may be used in an ongoing manner to perform Inter-Policy Communication (IPC) without having to create a pipe. Low-level policies, in particular, may need a communication mechanism that does not rely on pipes. The pipe transport policy for example, may not be able to use a pipe to communicate with instances of itself. In one embodiment, policy implementations may be preconfigured into a peer or may be loaded from the network. In one embodiment, the process of finding, downloading and installing a policy implementation from the network may be similar to performing a search on the Internet for a web page, retrieving the page, and then installing the required plug-in. Once a policy is installed and activated, pipes or the policy resolver protocol may be used by the implementation to communicate with all instances of the same policy.

In one embodiment, a policy may have a name that also indicates the type and/or purpose of the policy. An optional set of keywords may further describe the policy. In one embodiment, the name and keyword elements may be stored within a markup language (e.g. XML) policy advertisement document. Each policy advertisement document may be embedded in a peer group's advertisement document. In one embodiment, a policy advertisement may provide the policy resolver with only a portion of the search criteria needed to find a suitable implementation. The other information needed to execute a successful policy search may include a peer advertisement. In one embodiment, a peer advertisement may include, but is not limited to, a peer's:

communication endpoints (addresses on its active network transports);
runtime name (Java, SPARC, x86, etc.);
additional runtime constraints and requirements (optional);
peer name (optional); and
security policies (optional).

In one embodiment, a peer group may include two or more cooperating peers that adhere to one or more policies. In one embodiment, the peer-to-peer platform does not dictate when, where, or why to create a peer group. The kinds of peer groups found in the platform are determined by the set of policies assigned to those groups. In one embodiment, peers wishing to join a peer group may first locate a current member of the peer group, and then request to join the peer group. The application to join may either be rejected or accepted by one or more of the current members. In one embodiment, membership acceptance policies may enforce a vote, or alternatively may elect one or more designated group representatives to accept or reject new membership applications. The peer-to-peer platform recognizes several motivations for creating or joining peer groups including, but not limited to, communication and content sharing.

One embodiment of the peer-to-peer platform may provide support for communication and content sharing groups including, but not limited to, the ability to find nearby peers, the ability to find named peers anywhere on the peer-to-peer platform, the ability to find named peer groups anywhere on the peer-to-peer platform, and the ability to find and exchange shared content.

One embodiment of the peer-to-peer platform may provide a discovery policy that may be used to search for peers, and peer groups 304. The search criteria may include a peer or peer group name (string). One embodiment of the peer-to-peer platform may provide an authentication policy that may be used to validate, distribute, and authenticate a group member's credentials. The authentication policy may define the type of credential used in the message-based protocols used within the peer group. The authentication policy may be the initial point of connect (like a login) for all new group members.

One embodiment of the peer-to-peer platform may provide a membership policy that may be used by the current members to reject or accept a new group membership application. Current members may use the membership policy during the login process. One embodiment of the peer-to-peer platform may provide a content sharing policy that may define the rules for content exchange. Each peer in a group may store content. The sharing policy may encapsulate such behaviors as access, replication, and searching.

One embodiment of the peer-to-peer platform may provide a policy resolver policy that may be used to execute the implementation search. Once the implementation is activated, the resolver may maintain its name and status within the peer and respond to requests to find active policies. One embodiment of the peer-to-peer platform may provide a pipe resolver policy that may be used to locate all the peers using (e.g. bound to) a specific pipe.

Network peer groups may be formed based upon the proximity of one peer to another peer. Proximity-based peer groups may serve to subdivide the network into abstract regions. A region may serve as a placeholder for general communication and security policies that deal with existing networking infrastructure, communication scopes and security requirements. In one embodiment, the peer-to-peer platform may include a network peer group discovery protocol that may be used by peers to find network regions and to obtain a region's peer group advertisement document.

As an individual peer boots, it may use the network peer group discovery protocol to determine information including, but not limited to:
  what network region the peer is attached to;
  what policies are associated with this region of the network. In one embodiment, administration and security policies may be embedded within the net peer group advertisement to help peers identify which policies may be required within the local existing network infrastructure;
  what other peers are attached to this same network region; and
  what services exist on those other peers attached to this same network region.

The network regions are virtual regions. In other words, their boundaries may or may not reflect any underlying physical network boundaries such as those imposed by routers and firewalls. In one embodiment, the concept of a region may virtualize the notion of routers and firewalls, subdividing the network in a self-organizing fashion without respect to actual physical network boundaries.

Content peer groups may be formed primarily to share resources such as services and files. Content peer groups may contain peers from any network peer group, or even peers that do not belong to a network peer group. The rules of sharing content may be determined by the peer group's content sharing policy. Each peer in the content peer group may store a portion of the overall group content. Peers may work together to search, index, and update the collective content. The use of filenames to identify shared content may cause problems including naming collisions. In one embodiment, the peer-to-peer platform addresses this shared content naming problem by letting services and applications use metadata to describe shared content. The metadata may contain much more specific information (e.g. XML-typed information) that may prevent collisions and improve search accuracy. Furthermore, in one embodiment, multiple metadata descriptors (called content advertisements) may be used to identify a single instance of shared content. Allowing multiple advertisements enables applications and services to describe content in a very personal, custom manner that may enable greater search accuracy in any language.

The peer-to-peer platform's security model may be orthogonal to the concepts of peers, policies, peer groups 304, and pipes in the peer-to-peer platform. In one embodiment, security in the peer-to-peer platform may include, but is not limited to:
  credentials—a credential is an opaque token that may provide an identity and a set of associated capabilities;
  authenticators—an authenticator is code that may receive messages that either request a new credential or request that an existing credential be validated; and
  policies—security policies at both the network and content peer group level may provide a comprehensive security model that controls peer-to-peer communication as well as content sharing.

In one embodiment, all messages may include a network peer group credential that identifies the sender of the message as a full member in good standing. In addition to this low-level communication credential, content peer groups may define membership credentials that define a member's rights, privileges, and role within the group and content access and sharing credentials that define a member's rights to the content stored within the group.

Figure 11:
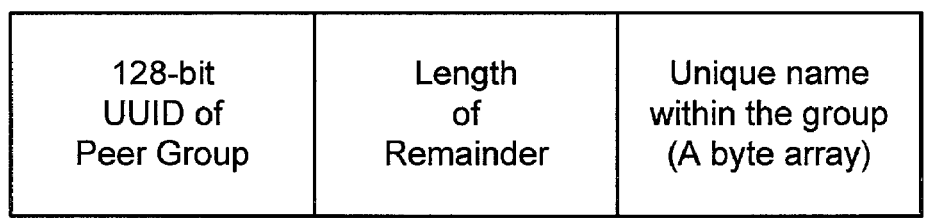
FIG. 11 illustrates an exemplary content identifier according to one embodiment.

One motivation for grouping peers together is to share content. Types of content items that may be shared include, but are not limited to, text files, structured documents such as PDF and XML files, and active content like a network service. In one embodiment, content may be shared among group members, but not groups, and thus no single item of content may belong to more than one group. In one embodiment, each item of content may have a unique identifier also known as its canonical name. This name may include a peer group universal unique identifier (UUID) and another name that may be computed, parsed, and maintained by peer group members. In one embodiment, the content's name implementation within the peer group is not mandated by the peer-to-peer platform. The name may be a hash code, a URI, or a name generated by any suitable means of uniquely identifying content within a peer group. The entire canonical content name may be referred to as a content identifier. FIG. 11 illustrates an exemplary content identifier according to one embodiment. In one embodiment, a content item may be advertised to make the item's existence known and available to group members through the use of content advertisements.

Each peer group member may share content with other members using a sharing policy that may name or rely on a sharing protocol. The default content sharing protocol may be a standard peer group sharing protocol of the peer-to-peer platform. Higher-level content systems such as file systems and databases may be layered upon the peer group sharing protocol. In on embodiment, the peer group sharing protocol is a standard policy embodied as a core protocol. In one embodiment, higher-level content protocols are optional and may be mandated by a custom policy and not the peer-to-peer platform.

Figure 12:
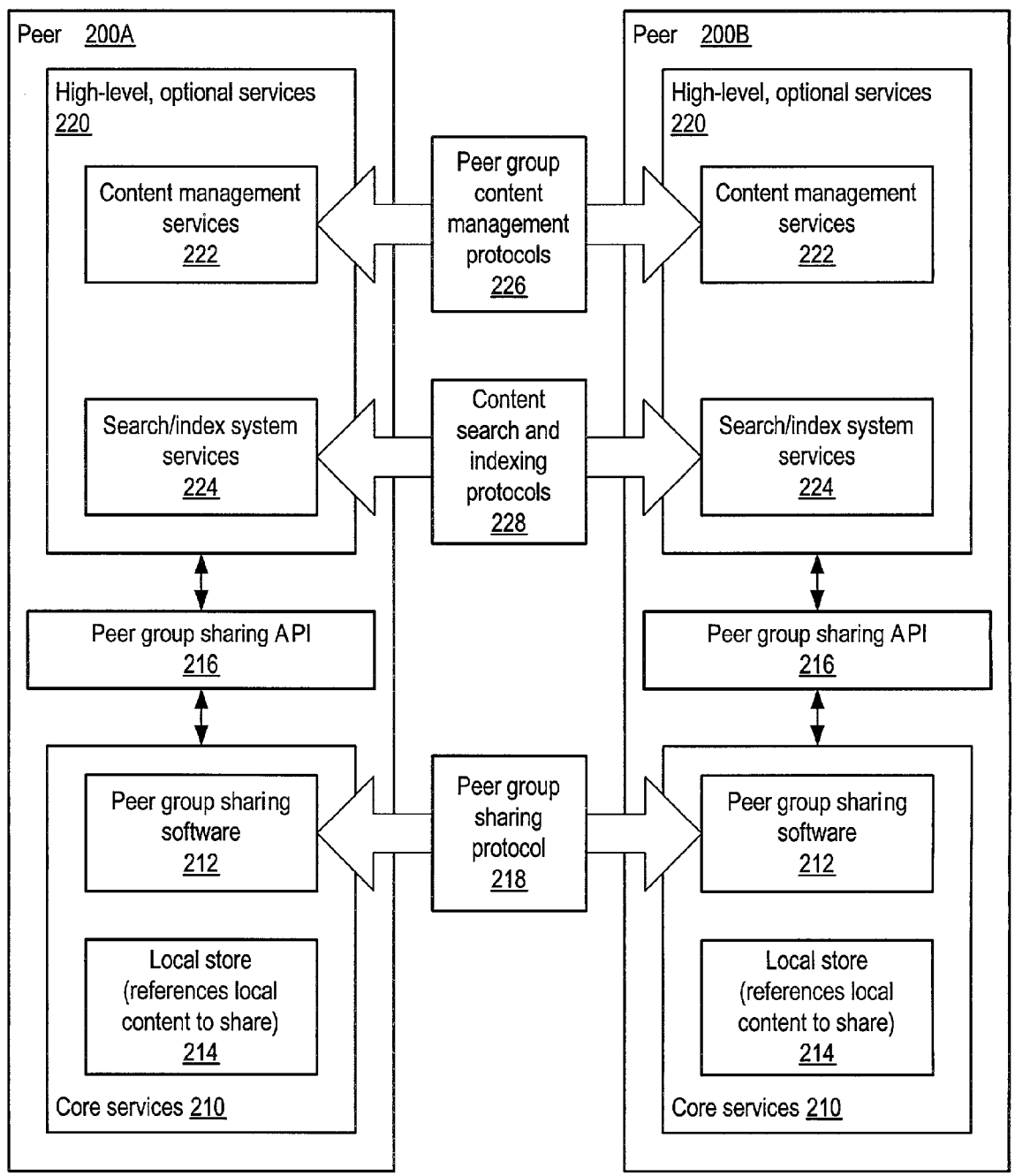
FIG. 12 is a block diagram illustrating two peers using a layered sharing policy and protocols to share content according to one embodiment.

FIG. 12 is a block diagram illustrating two peers using a layered sharing policy and several protocols to share content according to one embodiment. Each peer 200 includes core services 210 and one or more high-level, optional services 220. Core services 210 may include peer group sharing software that may be used to access a local store 214 (e.g.

sharable content). High-level services 220 may include such services as the content management services 222 and the search and index system services 224 of this illustration. The core services 210 and high-level services 220 interface through a peer group sharing API 216 to the peer group sharing software 212. The peer group sharing software 212 on the two peers 200 may interface to each other using the low-level peer group sharing protocol 218. High-level services 220 may interface using higher-level protocols. For example, the content management services 222 on the two peers may interface using peer group content management protocols 226, and the search and index system services 224 may interface using content search and indexing protocols 228.

An instance of content may be defined as a copy of an item of content. Each content copy may reside on a different peer in the peer group. The copies may differ in their encoding type. HTML, XML and WML are examples of encoding types. These copies may have the same content identifier, and may even exist on the same peer. An encoding metadata element may be used to differentiate the two copies. Each copy may have the same content identifier as well as a similar set of elements and attributes. Making copies of content on different peers may help any single item of content be more available. For example, if an item has two instances residing on two different peers, only one of the peers needs to be alive and respond to the content request. In one embodiment, whether to copy an item of content may be a policy decision that may be encapsulated in higher-level applications and services.

One embodiment of the peer-to-peer platform may provide a content management service. A content management service is a non-core (high-level) service that uses the peer group sharing protocol to facilitate content sharing. In one embodiment, the peer group sharing protocol does not mandate sharing policies regarding the replication of content, the tracking of content, metadata content (including indexes), and content relationship graphs (such as a hierarchy). In one embodiment, the content management service may provide these extra features.

Items of content that represent a network service may be referred to as active content. These items may have additional core elements above and beyond the basic elements used for identification and advertisement. Active content items may be recognized by Multi-Purpose Internet Mail Extensions (MIME) content type and subtype. In one embodiment, all peer-to-peer platform active contents may have the same type. In one embodiment, the subtype of an active content may be defined by network service providers and may be used to imply the additional core elements belonging to active content documents. In one embodiment, the peer-to-peer platform may give latitude to service providers in this regard, yielding many service implementation possibilities. Some typical kinds of elements associated with a network service may include, but are not limited to:

lifecycle elements—an instance of active content may adhere to a lifecycle. A lifecycle element defines a set of behavior states such as started and stopped. The lifecycle element may itemize the service's lifecycle and a set of instructions used to manipulate the lifecycle;

runtime elements—runtime elements define the set of local peer runtimes in which this active content can execute (e.g. Java, Solaris, win32 . . . );

user interface elements—a user interface element defines the policy or policies by which a user interface is displayed;

configuration elements—a configuration element defines the policy or policies by which the service may be configured; and Storage elements—a storage element defines the policy or policies the service may use for persistent and/or transient storage.

As previously discussed, each peer may have a core protocol stack, a set of policies and one or more services. In one embodiment, the peer-to-peer platform may define a standard service advertisement. In one embodiment, the standard service advertisement may include lifecycle, runtime, and configuration elements.

Some services may be applications. An application may have a user interface element and a storage element in addition to the lifecycle, runtime, and configuration elements. In one embodiment, a service advertisement may also include startup information. The startup information may direct the local core peer software as to how and when to start the service. For example, some services may be marked (in the advertisement) to start at boot, while others may be marked to start when a message arrives in a specific advertised pipe. In one embodiment, services marked to start when a message arrives in a specific advertised pipe may be used to implement daemon services that block in the background awaiting a message to arrive in an input pipe.

In one embodiment, the peer-to-peer platform recognizes two levels of network services: peer services and peer group services. Each level of service may follow the active content typing and advertisement paradigm, but each level may provide a different degree (level) of reliability. In one embodiment, a peer service may execute on a single peer network node only. If that node happens to fail, the service fails too. This level of service reliability may be acceptable for an embedded device, for example, providing a calendar and email client to a single user. A peer group service, on the other hand, may include a collection of cooperating peer services. If one peer service fails, the collective peer group service may not be affected, because chances are that one or more of the other peer services are healthy. Thus, a peer group service may provide consumers (client peers) a highly reliable, fault-tolerant cluster of identical service implementations, servicing multiple concurrent peer requests. Services of this kind may be defined as content within the peer group. Specific service instances (as represented by service advertisements) may be obtained using the peer information protocol. In one embodiment, peers have the option of contacting a specific service instance using the peer information protocol, or by contacting a group of services through a special active content policy.

One embodiment of the peer-to-peer platform may use advertisements. Advertisements are language-neutral abstract data structures. In one embodiment, advertisements may be defined in a markup language such as XML. In one embodiment, in accordance with a software platform binding, advertisements may be converted to and from native data structures such as Java objects or 'C' structs. In one embodiment, each protocol specification may describe one or more request and response message pairs. Advertisements may be documents exchanged in messages. The peer-to-peer platform may defines standard advertisement types including, but not limited to, policy advertisements, peer advertisements, peer group advertisements, pipe advertisements, service advertisements, and content advertisements. In one embodiment, subtypes may be formed from these basic types using schemas (e.g. XML schemas). Subtypes may add extra, richer metadata such as icons. In one embodiment, the peer-to-peer platform protocols, policies, and core software services may operate only on the basic abstract types.

In one embodiment, all peer-to-peer platform advertisements are represented in XML. XML may provide a means of representing data and metadata throughout a distributed system. XML may provide universal (software-platform neutral) data because it may be language agnostic, self-describing, strongly-typed and may ensure correct syntax. In one embodiment, the peer-to-peer platform may use XML for platform resource advertisements and for defining the messages exchanged in the protocol set. Existing content types (MIME) may be described using a level of indirection called metadata. All XML Advertisements may be strongly typed and validated using XML schemas. In one embodiment, only valid XML documents that descend from the base XML advertisement types may be accepted by peers supporting the various protocols requiring that advertisements be exchanged in messages. Another feature of XML is its ability to be translated in to other encodings such as HTML and WML. In one embodiment, this feature of XML may be used to provide support for peers that do not support XML to access advertised resources.

In one embodiment, advertisements may be composed of a series of hierarchically arranged elements. Each element may contain its data and/or additional elements. An element may also have attributes. Attributes may be name-value string pairs. An attribute may be used to store metadata, which may be used to describe the data within the element.

In one embodiment, peer-to-peer platform advertisements may contain elements including, but not limited to:

default language encoding element—in one embodiment, all human readable text strings are assumed to be of this encoding, unless otherwise denoted. As an example:

<default Language>en-CA</default Language> resource name (canonical name string containing a UUID)—in one embodiment, a unique128-bit number naming the resource within the platform; and one or more <Peer Endpoint> elements used to access the resource. Peer endpoint elements may contain a network transport name (for example, a string followed by a '://') and a Peer address on transport (for example, a string).

Peer-to-peer platform advertisements may also contain one or more optional elements including, but not limited to, a resource provider description element and a resource provider security policy element. A resource provider description element may be a standard element that describes the provider of the resource. A resource provider security policy element may be a standard element that describes the provider's security.

A resource provider description element may include, but is not limited to:

a title (non-canonical string suitable for UI display)

a provider name (canonical name string containing a UUID)

a version (a string)

a URI to obtain additional Info (a string)

For example, a light switch service provider's description element might be:

<title>ABC Programmable Lighting Switch</title>
<provider>ABC, an XYZ Company</provider>
<version>1.0</version>
<additionalInfo>http://www.XYZ.Com/ABC/x10/</additionalInfo>

In one embodiment, the same set of descriptive information (title, provider name, version, and additional info URI) may be used throughout all advertisement types to describe the particular provider.

A resource provider security policy element may include, but is not limited to:

an authentication policy—an embedded policy advertisement that describes the manner in which this provider authenticates others; and a credentialing policy—an embedded policy advertisement. The provider's credentialing policy for enabling others to authenticate the provider.

A policy advertisement may describe a behavior, convention, or rule necessary to interact with a platform resource such as a pipe, service, or peer group. FIG. 13 illustrates one embodiment of a policy advertisement. A policy advertisement may be used to help find the proper policy implementation for the requesting peer. This advertisement document may be embedded in other types of advertisements. Policy statements made by this document may apply to any resource, service, or peer group in the platform. Policy and security are orthogonal concepts to peers, peer groups 304, content, and services in the peer-to-peer platform.

A peer advertisement describes a peer network node within the peer-to-peer platform. FIG. 14 illustrates one embodiment of a peer advertisement. A peer advertisement may be used to help find the proper policy implementation for the requesting peer.

A peer group advertisement describes a collection of cooperating peers. FIG. 15 illustrates one embodiment of a peer group advertisement. A peer group advertisement may define the group membership process. In one embodiment, more than one kind of peer group advertisements may exist for a single group. In one embodiment, some basic kinds of peer group advertisement (with information for non-members only) may be published most often on the platform. In one embodiment, the only common elements found in all kinds of peer group advertisements is one or more standard peer-to-peer platform policies. Once a peer joins a group, that peer may receive (depending upon the membership policy) a full membership-level advertisement. The full membership advertisement, for example, might include the policy (may be required of all members) to vote for new member approval.

A pipe advertisement describes an instance of a peer-to-peer communication channel. FIG. 16 illustrates one embodiment of a pipe advertisement. In one embodiment, a pipe advertisement document may be published and obtained using either the content sharing protocol or by embedding it within other advertisements such as a peer group advertisement.

A service advertisement describes an instance of peer behavior or protocol. FIG. 17 illustrates one embodiment of a service advertisement. In one embodiment, the core services, for example, are made available to the platform by publishing a service advertisement. This advertisement document may be published and obtained using the peer information protocol. In one embodiment, service advertisements may include one or more access policies that describe how to activate and/or use the service. The core peer services (that each peer implements in order to respond to protocol messages) may advertise their existence in this manner. In one embodiment, the access method for the core services may be a schema of valid XML messages accepted by the service.

A content advertisement describes an item of content stored somewhere in a peer group. FIG. 18 illustrates one embodiment of a content advertisement. A content advertisement may be obtained using the peer group sharing protocol. In one embodiment, all items of content have a content identifier. A content identifier may be a unique identifier also known as its canonical name. This name may include a peer group UUID and another name computed, parsed, and maintained by peer group members only. The content's name implementation within the peer group is not mandated by peer-to-peer platform. The name may be a hash code, a URI, or any suitable means of uniquely identifying content within a peer group. The entire canonical content name is referred to as a content identifier.

An item of content's data may be encoded "by value." In other words, the item contains an in-line document that holds the content's data. Alternatively, an item of content's data may be encoded "by reference." In other words, the item contains a URI referencing the actual document holding the data. A size element may be provided for items of content. In one embodiment, the size is the total size of the content in bytes. In one embodiment, the size is a long (unsigned 64-bits).

The "size", "by-value" and "by-reference" elements are three kinds of elements that may be stored in a content advertisement document. An unlimited number of other types of elements may be added to a content advertisement. An item of content may also contain elements including, but not limited to:

- type element—the MIME type (encoding is deduced from type) of the in-line or referenced data.
- aboutID element—if the advertised content is another advertisement (based upon its type), this is the content identifier of the referenced content. Otherwise, the element doesn't exist.
- Peer identifier element—if the advertised content is another advertisement (based upon its type), this is the peer endpoint (which is bound to a pipe) on which a specific instance of the content (identified by aboutID) may exist. In one embodiment, if an advertisement is to refer to no particular instance of content, this field may be NULL or the element doesn't exist. This field may be used to help the advertisement dereferencing process. Given the unreliable nature of peers, any peer named here may in fact not be available. When the referenced peer isn't available, a search of the peer group may be performed (e.g. by a content management service) to find another suitable instance of the same content by matching the content identifier named in the aboutID element.

Figure 19:
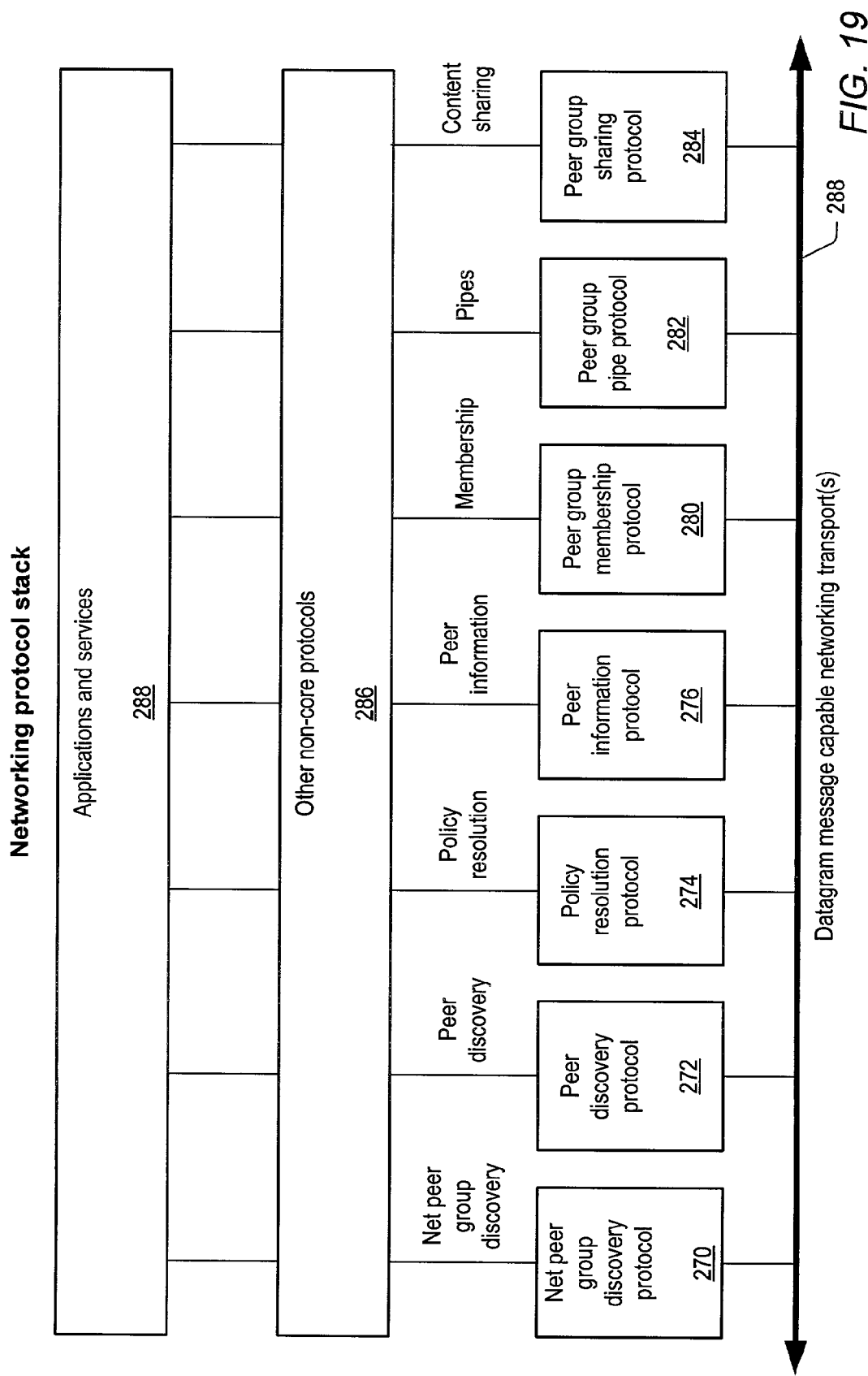
FIG. 19 is a block diagram illustrating one embodiment of a network protocol stack in a peer-to-peer platform.

FIG. 19 is a block diagram illustrating one embodiment of a network protocol stack in a peer-to-peer platform. In this embodiment, the peer-to-peer platform may include, but is not limited to, the following networking protocols:

- a network peer group discovery protocol 270 that allows a peer to discover and establish abstract network regions.
- a peer discovery protocol 272 that allows a peer to discover other peers and peer groups 304. This protocol may be used to find members of any kind of peer group, presumably to request membership.
- a policy resolution protocol 274 that allows a peer to find an implementation of a peer group behavior suitable for its node type (e.g. Java or native).
- a peer information protocol 276 that allows a peer to learn about other peers' capabilities and status.
- a peer group membership protocol 280 that allows a peer to join or leave peer groups 304, and to manage membership policies, rights and responsibilities.
- a peer group pipe protocol 282 that allows a peer group member to communicate with other members by exchanging Datagram messages, for example, on a Datagram message capable networking transport 288.
- a peer group content sharing protocol 284 that allows peer group members to share content.

Other embodiments may include other networking protocols, and/or may not include some of the protocols described in this embodiment.

As illustrated in FIG. 19, the core networking protocols 270-284 may be used as a basis for constructing other non-core protocols 286. Applications and services 288 may then be constructed that may use the core and non-core protocols to participate in the peer-to-peer platform.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or nonvolatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

In summary, a system and method for providing a name service in a peer-to-peer environment have been disclosed. It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method for providing a discovery service in a peer-to-peer network, the method comprising:
   a peer group name server receiving information about a peer group, wherein the peer group comprises one or more peers as member peers of the peer group, wherein the one or more peers reside on one or more network nodes coupled to the network; and
   the peer group name server storing the received information about the peer group;
   wherein the information about the peer group stored on the peer group name server is accessible to entities on the network through the peer group name server to discover the peer group.

2. The method as recited in claim 1, wherein the information about the peer group includes information configured for use by the entities in joining the peer group.

3. The method as recited in claim 1, wherein the information about the peer group includes a peer group name of the peer group and a peer group identifier of the peer group.

4. The method as recited in claim 1, further comprising:
   the peer group name server receiving information about the one or more member peers of the peer group; and
   the peer group name server storing the received information about the one or more member peers of the peer group;
   wherein the information about the one or more member peers stored on the peer group name server is accessible to entities on the network through the peer group name server to discover the one or more member peers of the peer group.

5. The method as recited in claim 4, wherein the information about each of the one or more member peers of the peer group includes a peer name of the particular peer and a peer identifier of the particular peer.

6. The method as recited in claim 4, wherein the information about each of the one or more member peers includes information configured for use in accessing the particular member peer to communicate directly with the particular member peer via the network.

7. The method as recited in claim 1, wherein the peer group name server is a member peer of the peer group.

8. The method as recited in claim 1, further comprising:
the peer group name server receiving information about one or more other peer groups each comprising one or more member peers; and
the peer group name server storing the received information about the one or more other peer groups;
wherein the information about the one or more other peer groups stored on the peer group name server is accessible to the entities on the network through the peer group name server to discover the one or more peer groups.

9. The method as recited in claim 1, wherein the peer group name server further comprises information about another peer group name server, wherein the other peer group name server comprises information about one or more other peer groups each comprising one or more peers as members of the particular peer group, wherein the information about the one or more other peer groups stored on the other peer group name server is accessible to the entities on the network through the peer group name server to discover the one or more other peer groups.

10. The method as recited in claim 1, wherein the peer group name server is configured to operate in accordance with a peer-to-peer platform in the peer-to-peer network, wherein the peer-to-peer platform includes one or more protocols configured for use in communications among peers participating in the peer-to-peer network, and wherein the peer-to-peer platform further includes one or more policies that define rules and conventions for the peers participating in the peer-to-peer network.

11. A method for discovery in a peer-to-peer network, the method comprising:
accessing a peer group name server coupled to a network, wherein the peer group name server comprises information about a peer group comprising one or more peers as member peers of the peer group, wherein the one or more peers reside on one or more network nodes coupled to the network; and
discovering the peer group from the information about the peer group on the peer group name server;
wherein the information about the peer group includes information configured for use in joining the peer group.

12. The method as recited in claim 11, wherein the information about the peer group includes a peer group name of the peer group and a peer group identifier of the peer group.

13. The method as recited in claim 11, further comprising joining the discovered peer group to become a member peer of the peer group.

14. The method as recited in claim 13, wherein said accessing, said discovering, and said joining are initiated from a process executing within a first network node, and wherein the process becomes the member peer of the peer group.

15. The method as recited in claim 14, wherein the first network node comprises information about the peer group name server, wherein the information about the peer group name server includes information configured for use in said accessing the peer group name server, the method further comprising:
the process accessing the information about the peer group name server prior to said accessing the peer group name server;
wherein the process uses the information about the peer group name server in said accessing the peer group name server.

16. The method as recited in claim 13, further comprising:
prior to said accessing the peer group name server:
the process broadcasting a discovery message on the network; and
the peer group name server sending a response message to the process in response to the discovery message;
wherein the response message includes access information for the peer group name server, wherein the process uses the access information for the peer group name server from the response message in said accessing the peer group name server.

17. The method as recited in claim 13, further comprising amending the information about the peer group on the peer group name server to indicate that the peer is a member peer of the peer group in response to said joining the peer group.

18. The method as recited in claim 13, further comprising:
the peer leaving the peer group; and
amending the information about the peer group on the peer group name server to indicate that the peer is no longer a member peer of the peer group in response to said leaving.

19. The method as recited in claim 11, wherein the peer group name server further comprises information about the one or more member peers of the peer group.

20. The method as recited in claim 19, wherein the information about each of the one or more member peers of the peer group includes a peer name of the particular peer and a peer identifier of the particular peer.

21. The method as recited in claim 19, further comprising discovering the one or more member peers of the peer group from the information about the one or more member peers of the peer group on the peer group name server.

22. The method as recited in claim 19, wherein the information about each of the one or more member peers includes information configured for use in accessing the particular member peer to communicate directly with the particular member peer via the network.

23. The method as recited in claim 22, further comprising accessing a first member peer of the one or more member peers of the peer group using the information about the first member peer.

24. The method as recited in claim 11, wherein the peer group name server is a member peer of the peer group.

25. The method as recited in claim 11, wherein the peer group name server further comprises information about a plurality of peer groups each comprising one or more peers as members of the particular peer group, wherein the peer group is one of the plurality of peer groups.

26. The method as recited in claim 25, wherein said discovering discovers the plurality of peer groups from the information about the plurality of peer groups on the peer group name server.

27. The method as recited in claim 26, further comprising:
selecting the peer group from the discovered plurality of peer groups; and
joining the selected peer group as a member peer of the peer group.

28. The method as recited in claim 11, wherein the peer group name server further comprises information about another peer group name server, wherein the other peer group name server comprises information about one or more other peer groups each comprising one or more peers as members of the particular peer group.

29. The method as recited in claim 28, wherein said discovering comprises discovering through the peer group name server the one or more other peer groups from the information about the one or more other peer groups on the other peer group name server.

30. The method as recited in claim 11, wherein the peer group name server is configured to operate in accordance with a peer-to-peer platform in the peer-to-peer network, wherein the peer-to-peer platform includes one or more protocols configured for use in communications among peers participating in the peer-to-peer network, and wherein the peer-to-peer platform further includes one or more policies that define rules and conventions for the peers participating in the peer-to-peer network.

31. A method for providing name resolution in a peer-to-peer network, the method comprising:
a first peer in the peer-to-peer network accessing a peer group name server in the peer-to-peer network, wherein the peer group name server comprises information about one or more entities in the peer-to-peer network, wherein the information comprises, for each of the one or more entities, a symbolic name and an associated entity identifier of the entity, wherein the entity identifier is configured for use in establishing a connection with the particular entity in the peer-to-peer network;
the first peer sending a symbolic name of an entity to the peer group name server;
the peer group name server locating a copy of the symbolic name in the information about the one or more entities to determine an entity identifier associated with the symbolic name; and
the peer group name server sending the entity identifier associated with the symbolic name to the first peer.

32. The method as recited in claim 31, wherein the symbolic name is a peer name of a second peer, and wherein the entity identifier sent to the first peer is a peer identifier for the second peer.

33. The method as recited in claim 32, further comprising the first peer establishing a peer-to-peer connection with the second peer using the peer identifier for the second peer.

34. The method as recited in claim 31, wherein the symbolic name is a peer group name, and wherein the entity identifier sent to the first peer is a peer group identifier for the peer group with the peer group name.

35. The method as recited in claim 34, further comprising the first peer joining the peer group using the peer group identifier.

36. The method as recited in claim 31, wherein the peer group name server is configured to operate in accordance with a peer-to-peer platform in the peer-to-peer network, wherein the peer-to-peer platform includes one or more protocols configured for use in communications among peers participating in the peer-to-peer network, and wherein the peer-to-peer platform further includes one or more policies that define rules and conventions for the peers participating in the peer-to-peer network.

37. A peer group name server comprising:
a processor;
a port operable to couple the device to a network;
a memory operable to store program instructions, wherein the program instructions are executable by the processor to:
receive via the network information about a peer group, wherein the peer group comprises one or more peers as member peers of the peer group, wherein the one or more peers reside on one or more network nodes coupled to the network; and
store the received information about the peer group on the peer group name server;
wherein the information about the peer group stored on the peer group name server is accessible to entities on the network through the peer group name server to discover the peer group.

38. The peer group name server as recited in claim 37, wherein the information about the peer group includes information configured for use in joining the peer group.

39. The peer group name server as recited in claim 37, wherein the information about the peer group includes a peer group name of the peer group and a peer group identifier of the peer group.

40. The peer group name server as recited in claim 37, wherein the program instructions are further executable by the processor to:
receive via the network information about the one or more member peers of the peer group; and
store the received information about the one or more member peers of the peer group on the peer group name server;
wherein the information about the one or more member peers stored on the peer group name server is accessible to entities on the network through the peer group name server to discover the one or more member peers of the peer group.

41. The peer group name server as recited in claim 40, wherein the information about each of the one or more member peers of the peer group includes a peer name of the particular peer and a peer identifier of the particular peer.

42. The peer group name server as recited in claim 40, wherein the information about each of the one or more member peers includes information configured for use in accessing the particular member peer to communicate directly with the particular member peer via the network.

43. The peer group name server as recited in claim 37, wherein the program instructions are further executable by the processor to:
receive via the network information about one or more other peer groups each comprising one or more member peers; and
store the received information about the one or more other peer groups on the peer group name server;
wherein the information about the one or more other peer groups stored on the peer group name server is accessible to the entities on the network through the peer group name server to discover the one or more peer groups.

44. A system comprising:
a peer group comprising one or more peers as member peers of the peer group, wherein the one or more peers are configured to execute on one or more network nodes coupled to a network;
a peer group name server coupled to the network, wherein the peer group name server is operable to store information about the peer group;

a network node coupled to the network, wherein the network node comprises a process executable within the network node to:
  access the peer group name server via the network; and
  discover the peer group from the stored information on the peer group name server;
wherein the information about the peer group stored on the peer group name server includes information configured for use by the process in joining the peer group as a member peer.

45. The system as recited in claim 44, wherein the information about the peer group includes a peer group name of the peer group and a peer group identifier of the peer group.

46. The system as recited in claim 44, wherein the process is further executable within the network node to join the discovered peer group as a member peer of the peer group.

47. The system as recited in claim 46, wherein the peer group name server is operable to amend the information about the peer group stored on the peer group name server to indicate that the process has joined as a member peer of the peer group.

48. The system as recited in claim 44, wherein the peer group name server is further operable to store information about the one or more member peers of the peer group, wherein the information about each of the one or more member peers includes information configured for use in accessing the particular member peer to communicate directly with the particular member peer via the network.

49. The system as recited in claim 48, wherein the information about each of the one or more member peers of the peer group includes a peer name of the particular peer and a peer identifier of the particular peer.

50. The system as recited in claim 48, wherein the process is further executable within the network node to discover the one or more member peers of the peer group from the information about the one or more member peers of the peer group stored on the peer group name server.

51. The system as recited in claim 50, wherein the process is further executable within the network node to access a first member peer of the one or more member peers of the peer group using the information about the first member peer.

52. The system as recited in claim 44, wherein the peer group name server is a member peer of the peer group.

53. The system as recited in claim 44, wherein the peer group name server is further operable to store information about a plurality of peer groups each comprising one or more peers as members of the particular peer group, wherein the peer group is one of the plurality of peer groups.

54. The system as recited in claim 53, wherein, in said discovering, the process is further executable within the network node to discover the plurality of peer groups from the information about the plurality of peer groups on the peer group name server.

55. The system as recited in claim 54, wherein the process is further executable within the network node to:
  select the peer group from the discovered plurality of peer groups; and
  join the selected peer group as a member peer of the peer group.

56. The system as recited in claim 44, wherein the peer group name server is further operable to store information about another peer group name server, wherein the other peer group name server is operable to store information about one or more other peer groups each comprising one or more peers as members of the particular peer group.

57. The system as recited in claim 56, wherein, in said discovering, the process is further executable within the network node to discover through the peer group name server the one or more other peer groups from the information about the one or more other peer groups on the other peer group name server.

58. A peer-to-peer network comprising:
  one or more peers, wherein the one or more peers are configured to execute on one or more network nodes coupled to the peer-to-peer network;
  a peer group name server coupled to the peer-to-peer network, wherein the peer group name server is operable to store information about one or more entities in the peer-to-peer network including the one or more peers, wherein the information comprises, for each of the one or more entities, a symbolic name and an associated entity identifier of the entity, wherein the entity identifier is configured for use in establishing a connection with the particular entity in the peer-to-peer network;
  wherein the peer group name server is operable to:
    receive a symbolic name of a first entity from a first peer of the one or more peers;
    locate a copy of the symbolic name in the information about the one or more entities to determine an entity identifier associated with the symbolic name; and
    send the entity identifier associated with the symbolic name to the first peer.

59. The peer-to-peer network as recited in claim 58, wherein the symbolic name is a peer name of a second peer of the one or more peers, wherein the entity identifier sent to the first peer is a peer identifier for the second peer, and wherein the first peer is configured to establish a peer-to-peer connection with the second peer using the peer identifier for the second peer.

60. The peer-to-peer network as recited in claim 58, wherein the symbolic name is a peer group name, wherein the entity identifier sent to the first peer is a peer group identifier for the peer group with the peer group name, wherein the peer group comprises one or more of the one or more peers, and wherein the first peer is configured to join the peer group using the peer group identifier.

61. A tangible, computer-accessible storage medium, comprising program instructions, wherein the program instructions are computer-executable to implement:
  receiving information about a peer group, wherein the peer group comprises one or more peers as member peers of the peer group, wherein the one or more peers reside on one or more network nodes coupled to a network; and
  storing the received information about the peer group;
  wherein the stored information about the peer group is accessible by entities on the network to discover the peer group.

62. The tangible, computer-accessible storage medium as recited in claim 61, wherein the information about the peer group includes information configured for use by the entities in joining the peer group.

63. The tangible, computer-accessible storage medium as recited in claim 61, wherein the program instructions are computer-executable to implement:
  receiving information about the one or more member peers of the peer group; and
  storing the received information about the one or more member peers of the peer group;

wherein the stored information about the one or more member peers is accessible by entities on the network to discover the one or more member peers of the peer group.

64. The tangible, computer-accessible storage medium as recited in claim 63, wherein the information about each of the one or more member peers includes information configured for use in accessing the particular member peer to communicate directly with the particular member peer via the network.

65. A tangible, computer-accessible storage medium, comprising program instructions, wherein the program instructions are computer-executable to implement:
   accessing a peer group name server coupled to a network, wherein the peer group name server comprises information about a peer group comprising one or more peers as member peers of the peer group, wherein the one or more peers reside on one or more network nodes coupled to the network; and
   discovering the peer group from the information about the peer group on the peer group name server;
   wherein the information about the peer group includes information configured for use in joining the peer group.

66. The tangible computer-accessible storage medium as recited in claim 65, wherein the program instructions are further computer-executable to implement joining the discovered peer group to become a member peer of the peer group.

67. The tangible, computer-accessible storage medium as recited in claim 65, wherein the peer group name server further comprises information about the one or more member peers of the peer group, wherein the program instructions are further computer-executable to implement discovering the one or more member peers of the peer group from the information about the one or more member peers of the peer group on the peer group name server.

68. The tangible, computer-accessible storage medium as recited in claim 67, wherein the information about each of the one or more member peers includes information configured for use in accessing the particular member peer to communicate directly with the particular member peer via the network.

69. The tangible, computer-accessible storage medium as recited in claim 68, wherein the program instructions are further computer-executable to implement accessing a first member peer of the one or more member peers of the peer group using the information about the first member peer.

70. A tangible, computer-accessible storage medium, comprising program instructions, wherein the program instructions are computer-executable to implement:
   a first peer in a peer-to-peer network accessing a peer group name server in the peer-to-peer network, wherein the peer group name server comprises information about one or more entities in the peer-to-peer network, wherein the information comprises, for each of the one or more entities, a symbolic name and an associated entity identifier of the entity, wherein the entity identifier is configured for use in establishing a connection with the particular entity in the peer-to-peer network;
   the first peer sending a symbolic name of an entity to the peer group name server;
   the peer group name server locating a copy of the symbolic name in the information about the one or more entities to determine an entity identifier associated with the symbolic name; and
   the peer group name server sending the entity identifier associated with the symbolic name to the first peer.

\* \* \* \* \*